(12) United States Patent
Rom et al.

(10) Patent No.: US 10,398,969 B2
(45) Date of Patent: *Sep. 3, 2019

(54) METHOD AND APPARATUS FOR PROCESSING STIMULUS SIGNALS GENERATED BY ACCESSORY DEVICES

(71) Applicant: STEELSERIES ApS, Frederiksberg (DK)

(72) Inventors: Kim Rom, San Francisco, CA (US); Jeffrey Nicholas Mahlmeister, Chicago, IL (US); Jacob Wolff-Petersen, Richmond (GB); Bruce Hawver, Hawthorn Woods, IL (US); Francis Arnold Grever, Palatine, IL (US); Tino Soelberg, Valby (DK); Christopher John Nicolella, Elk Grove Village, IL (US)

(73) Assignee: STEELSERIES ApS, Frederiksberg (DK)

( * ) Notice: Subject to any disclaimer, the term of this patent is extended or adjusted under 35 U.S.C. 154(b) by 0 days.

This patent is subject to a terminal disclaimer.

(21) Appl. No.: 15/816,335

(22) Filed: Nov. 17, 2017

(65) Prior Publication Data

US 2018/0071623 A1 Mar. 15, 2018

Related U.S. Application Data

(63) Continuation of application No. 15/158,218, filed on May 18, 2016, now Pat. No. 9,849,380, which is a
(Continued)

(51) Int. Cl.
*A63F 13/00* (2014.01)
*A63F 9/24* (2006.01)
(Continued)

(52) U.S. Cl.
CPC .............. *A63F 13/31* (2014.09); *A63F 13/02* (2013.01); *A63F 13/22* (2014.09); *A63F 13/428* (2014.09); *A63F 13/798* (2014.09); *A63F 13/98* (2014.09)

(58) Field of Classification Search
CPC .......... A63F 13/02; A63F 13/22; A63F 13/31; A63F 13/428; A63F 13/798; A63F 13/98;
(Continued)

(56) References Cited

U.S. PATENT DOCUMENTS 6,887,159 B2   5/2005  Leen et al.
6,979,267 B2  12/2005  Leen
(Continued)

*Primary Examiner* — Milap Shah
(74) *Attorney, Agent, or Firm* — Guntin & Gust, PLC; Mark Wilinski

(57) ABSTRACT

A system that incorporates teachings of the present disclosure may include, for example, determining first and second stimulus signals from first and second input functions of first and second gaming equipment devices used by first and second users to control a video game. A first contest between the first and second users is based on first and second game action results determined based on the first and second stimulus signals. A relative performance between the first and second users is determined from a comparison of first and second measures of the first and second stimulus signals. A second contest between the first user and the second user is based on the relative performance. Additional embodiments are disclosed.

20 Claims, 13 Drawing Sheets

Related U.S. Application Data continuation of application No. 14/628,910, filed on Feb. 23, 2015, now Pat. No. 9,370,717, which is a continuation of application No. 13/778,648, filed on Feb. 27, 2013, now Pat. No. 8,992,325.

(51) Int. Cl.
| | | |
|---|---|---|
| *A63F 13/31* | (2014.01) | |
| *A63F 13/428* | (2014.01) | |
| *A63F 13/22* | (2014.01) | |
| *A63F 13/798* | (2014.01) | |
| *A63F 13/98* | (2014.01) | |

(58) Field of Classification Search
CPC ........ A63F 13/20; A63F 13/21; A63F 13/218; A63F 13/219; A63F 13/23; A63F 13/235; A63F 13/24; A63F 13/245; A63F 13/45; A63F 13/46; A63F 13/803; A63F 13/814; A63F 13/837; A63F 2300/10; A63F 2300/1037; A63F 2300/1043; A63F 2300/1056; A63F 2300/1062; A63F 2300/60; A63F 2300/6045; A63F 2300/6054; A63F 2300/61; A63F 2300/8017; A63F 2300/8029; A63F 2300/8047

See application file for complete search history.

(56) References Cited

U.S. PATENT DOCUMENTS

| | | |
|---|---|---|
| 7,416,489 B2 | 8/2008 | Smith |
| 7,731,590 B2 | 6/2010 | Azuma |
| 8,070,607 B2 | 12/2011 | Takahashi |
| 8,092,300 B2 | 1/2012 | Shibamiya |
| 8,210,916 B2 | 7/2012 | Ma |
| 8,241,129 B2 | 8/2012 | O'Kelley |
| 8,485,899 B1 | 7/2013 | Rom et al. |
| 8,719,714 B2 | 5/2014 | Aronzon et al. |
| 8,992,325 B2 | 3/2015 | Rom et al. |
| 9,370,717 B2 | 6/2016 | Wolff-Petersen et al. |
| 9,849,380 B2 * | 12/2017 | Rom ................. A63F 13/428 |
| 2005/0153265 A1 | 7/2005 | Kavana |
| 2007/0184899 A1 | 8/2007 | Rantapuska et al. |
| 2008/0113698 A1 | 5/2008 | Egozy |
| 2008/0268943 A1 | 10/2008 | Jacob |
| 2009/0258700 A1 | 10/2009 | Bright et al. |
| 2009/0258702 A1 | 10/2009 | Flores et al. |
| 2009/0258705 A1 | 10/2009 | Guinchard et al. |
| 2010/0009749 A1 | 1/2010 | Chrzanowski, Jr. et al. |
| 2010/0081507 A1 | 4/2010 | Finocchio et al. |
| 2010/0087240 A1 | 4/2010 | Egozy et al. |
| 2011/0009192 A1 | 1/2011 | Aronzon et al. |
| 2011/0021269 A1 | 1/2011 | Wolff-Petersen et al. |
| 2013/0173032 A1 | 7/2013 | Rom et al. |
| 2013/0288759 A1 | 10/2013 | Rom et al. |
| 2014/0256427 A1 | 9/2014 | Wolff-Petersen et al. |
| 2016/0256773 A1 | 9/2016 | Rom et al. |

* cited by examiner

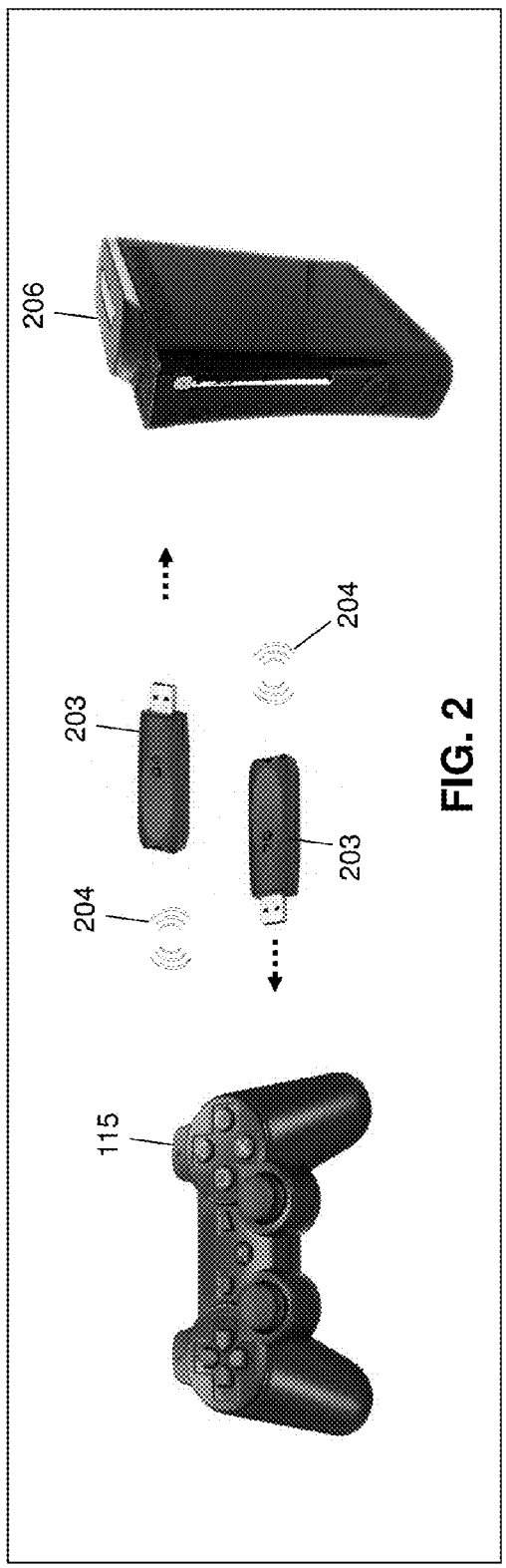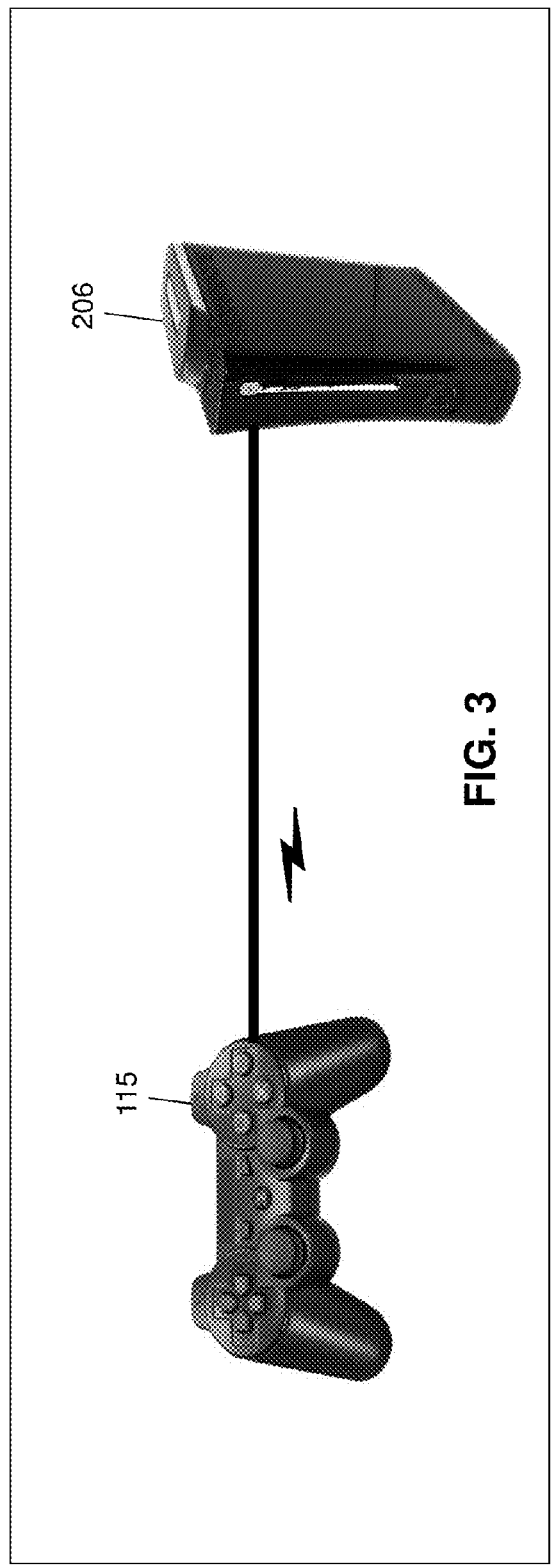

700

METHOD AND APPARATUS FOR PROCESSING STIMULUS SIGNALS GENERATED BY ACCESSORY DEVICES

CROSS-REFERENCE TO RELATED APPLICATIONS

This application is a continuation of U.S. patent application Ser. No. 15/158,218 filed May 18, 2016, which is a continuation of U.S. patent application Ser. No. 14/628,910 filed Feb. 23, 2015 (now U.S. Pat. No. 9,370,717), which is a continuation of U.S. patent application Ser. No. 13/778,648 filed Feb. 27, 2013 (now U.S. Pat. No. 8,992,325). All sections of the aforementioned applications are incorporated herein by reference in their entireties.

FIELD OF THE DISCLOSURE

The present disclosure relates generally to a method and apparatus for processing stimulus signals generated by accessory devices.

BACKGROUND

It is common today for gamers to utilize more than one gaming accessory. This is especially true of gamers who play on-line games or competitive games in a team or individual configuration. Gamers can have at their disposal accessories such as a keyboard, a general purpose gaming pad, a mouse, a gaming console controller, a headset with a built-in microphone to communicate with other players, a joystick, a computer console, or other common gaming accessories.

A gamer can frequently use a combination of these accessories in one game (e.g., headset, a keyboard, and mouse). Efficient management and utilization of these accessories can frequently impact a gamer's ability to compete.

Accessory management can have utility in other disciplines which may not relate to gaming applications. Efficient use of accessories in these other disciplines can be important to other users.

BRIEF DESCRIPTION OF THE DRAWINGS

Reference will now be made to the accompanying drawings, which are not necessarily drawn to scale, and wherein:

FIGS. 2-3 depict illustrative embodiments for communicatively coupling a gaming controller to a computing device;

DETAILED DESCRIPTION

Figure 1:
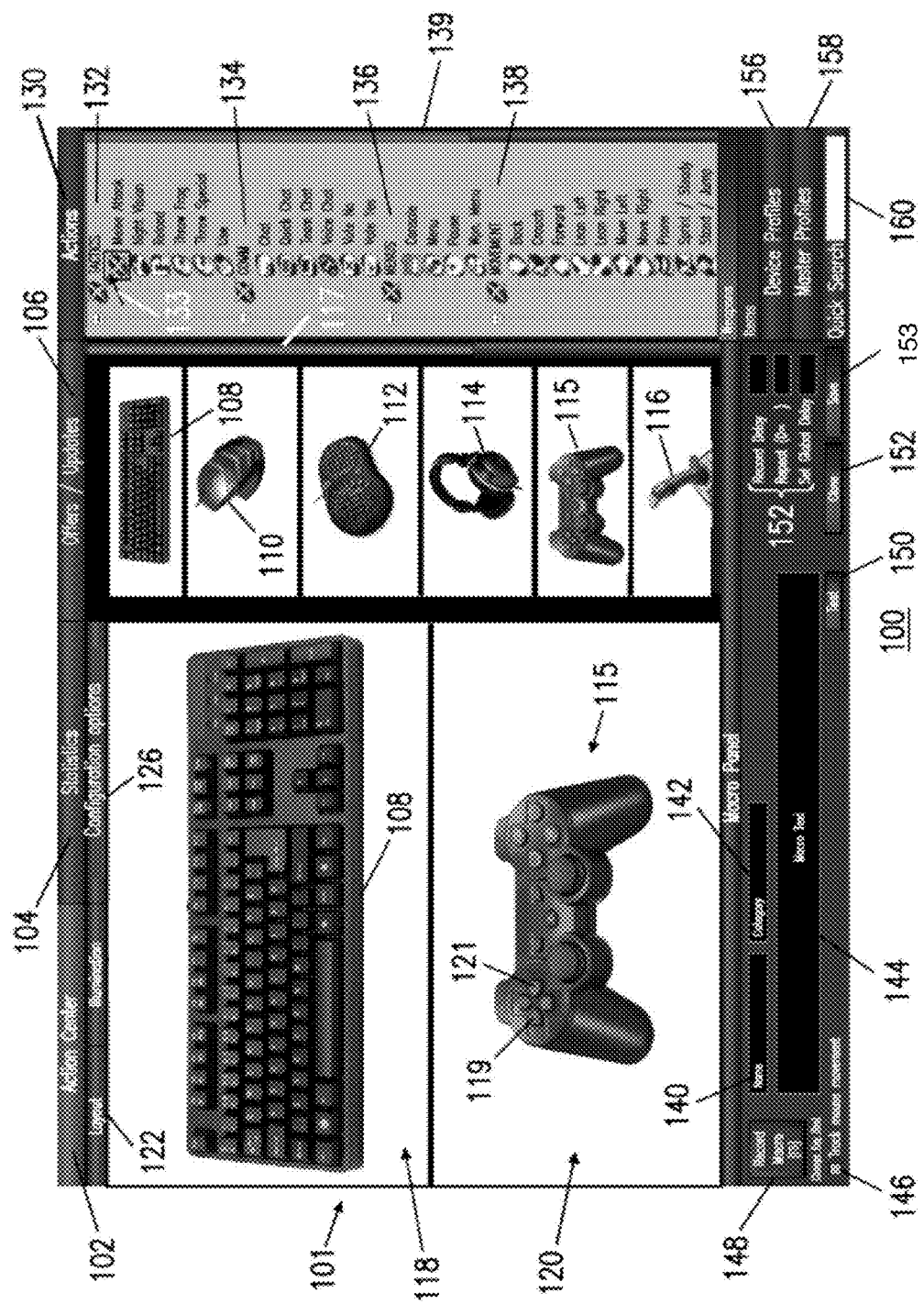
FIG. 1 depicts an illustrative embodiment of a Graphical User Interface (GUI) generated by an Accessory Management Software (AMS) application according to the present disclosure.

The subject disclosure describes, among other things, illustrative embodiments for collecting, processing, cataloguing and presenting performances of gamers based on stimulus signal generated by accessory devices. Also disclosed are embodiments for facilitating competitions, contests, or tournaments based on gamer proficiency in manipulating various features of a game controller. By way of example, such features of a game controller may relate to manipulation of a "fire" button in a shooting game, a strum button in a rhythm game, or a dance pedal in an exercise game. Such competitions based on gamer proficiency in manipulation of the game controller can be dedicated, or ancillary to the course of a computer game. For example, the competition can be based on a number of times a button is pressed, a rate at which the button is pressed, whether the correct button was pressed and so forth, according to a situational context of a game.

Such competitions can be distinguished from typical gaming competitions in that they are based on game control stimulus signals rather than game results alone. Such stimulus signals are typically provided to a game console or processor causing a result to occur within the course of progression of the game. Typically, game competitions are based on results of a game, e.g., scoring the most points, achieving the most kills, rather than some measure of the stimulus signal alone or in combination with the gaming results. Other embodiments are contemplated by the subject disclosure.

One embodiment of the present disclosure can entail a process including receiving, by a system including a processor, a first stimulus signal from a first gaming accessory device used by a first contestant and a second stimulus signal from a second gaming accessory device used by a second contestant. The first stimulus signal is representative of a first input function of the first gaming accessory device used by the first contestant and the second stimulus signal is representative of a second input function of the second gaming accessory device used by the second contestant. The process further includes determining, by the system, a first measure of the first stimulus signal and a second measure of the second stimulus signal, and determining, by the system, a first performance factor based upon the first measure of the first stimulus signal and a second performance factor based upon the second measure of the second stimulus signal. The process further includes comparing, by the system, the first performance factor to the second performance factor. A ranking is determined, by the system, of the first contestant and the second contestant according to the comparison, and an indication of the ranking is provided by the system.

Another embodiment of the present disclosure can entail a device including a memory to store computer instructions and a processor in communication with the memory. The processor, responsive to executing the computer instructions, performs operations including receiving a first stimulus signal from first equipment used by a first user to control a video game and a second stimulus signal from equipment used by a second user to control the video game. A comparison is performed of the first measure of the first stimulus and the second measure of the second stimulus. The processor further performs operations including determining from the comparison a relative performance between the first user and the second user, and providing an indication of the relative performance.

Yet another embodiment of the present disclosure can entail a computer-readable storage medium including computer instructions, which responsive to being executed by a processor, cause the processor to perform operations including receiving a plurality of stimulus signals from a plurality of stimulus signals from a plurality of gaming accessories used by a plurality of gamers that are members of a social network. Measures of the plurality of stimulus signals are determined. A competitive performance between the members of the social network is determined from the measures of the plurality of stimulus signals.

FIG. 1 depicts an illustrative embodiment of a Graphical User Interface (GUI) generated by an Accessory Management Software (AMS) application according to the present disclosure. The AMS application can be executed by a computing device such as a desktop computer, a laptop computer, a server, a mainframe computer, a gaming console, a gaming accessory, or combinations or portions thereof. The AMS application can also be executed by portable computing devices (with computing resources) such as a cellular phone, a personal digital assistant, a tablet (such as an iPAD™), or a media player (such as an iPOD™). It is contemplated that the AMS application can be executed by any device with suitable computing resources to perform the embodiments described herein.

FIG. 2 illustrates a number of embodiments for utilizing a wireless dongle 203 with gaming controller 115 or a gaming console (herein referred to as gaming console 206). In the illustration of FIG. 2, the USB portion of the dongle 203 can be physically engaged with the gaming controller 115 or the gaming console 206. The dongle 203 in either of these configurations can facilitate wireless communications 204 between the gaming controller 115 and the gaming console 206 (e.g., WiFi, Bluetooth, ZigBee, or proprietary protocol). It is contemplated that functions of the dongle 203 can in whole or in part be an integral part of the gaming controller 115 or the gaming console 206. It is also contemplated that the AMS application can in whole or in part be executed by computing resources of the dongle 203.

In one embodiment, the gaming controller 115 can be tethered to a computing device such as the gaming console 206 by a cable (e.g., USB cable) as shown in FIG. 3 to provide a means of communication less susceptible to electromagnetic interference or other sources of wireless interference. In one embodiment, the gaming controller 115 and the gaming console 206 can have an integrated wireless interface for wireless communications therebetween. It is contemplated that the AMS application can in whole or in part be executed by computing resources of the gaming controller 115, the gaming console 206, or combinations thereof.

Figure 4:
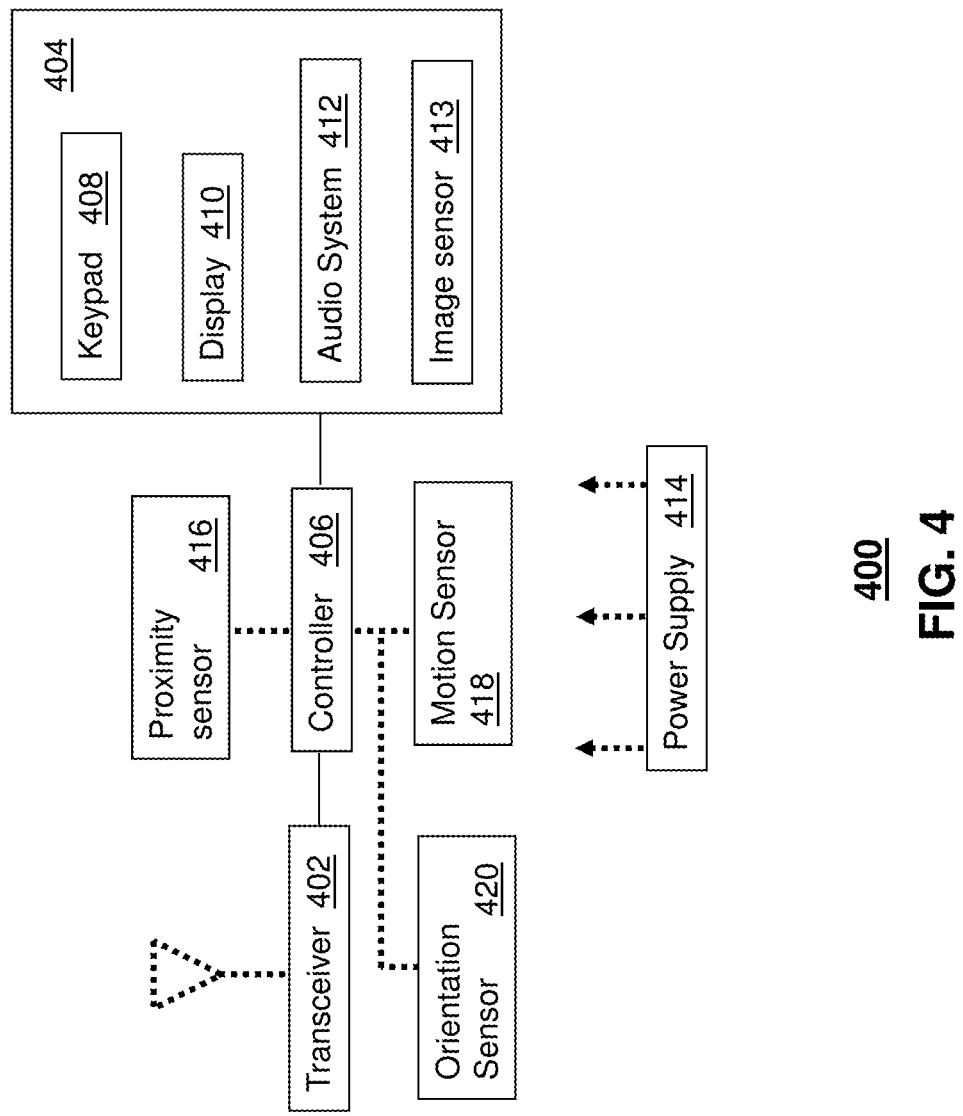
FIG. 4 depicts an illustrative embodiment of a communication device.

FIG. 4 depicts an illustrative embodiment of a communication device 400. The communication device 400 can serve in whole or in part as an illustrative embodiment of the devices depicted in FIGS. 1-3. The communication device 400 can include a wireline and/or wireless transceiver 402 (herein transceiver 402), a user interface (UI) 404, a power supply 414, a proximity sensor 416, a motion sensor 418, an orientation sensor 420, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, software defined radio (SDR), Long Term Evolution (LTE), as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 coupled to a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400.

In an embodiment where the display 410 is touch-sensitive, a portion or all of the keypad 408 can be presented by way of the display 410 with navigation features (e.g., an iPad™, iPhone™, or Android™ phone or tablet). As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements.

The UI 404 can also include an audio system 412 that utilizes common audio technology for conveying low volume audio (such as audio heard only in the proximity of a human ear) and high volume audio (such as speakerphone for hands free operation, stereo or surround sound system). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images and performing image recognition therefrom.

The power supply 414 can utilize common power management technologies such as replaceable or rechargeable batteries, supply regulation technologies, and charging system technologies for supplying energy to the components of the communication device 400 to facilitate long-range or short-range portable applications. Alternatively, the charging system can utilize external power sources such as DC power supplied over a physical interface such as a USB port or by way of a power cord attached to a transformer that converts AC to DC power.

The proximity sensor 416 can utilize proximity sensing technology such as an electromagnetic sensor, a capacitive sensor, an inductive sensor, an image sensor or combinations thereof. The motion sensor 418 can utilize motion sensing technology such as an accelerometer, a gyroscope, or other suitable motion sensing technology to detect movement of the communication device 400 in three-dimensional space. The orientation sensor 420 can utilize orientation sensing technology such as a magnetometer to detect the orientation of the communication device 400 (North, South, West, East, combined orientations thereof in degrees, minutes, or other suitable orientation metrics).

The communication device 400 can use the transceiver 402 to also determine a proximity to a cellular, WiFi, Bluetooth, or other wireless access points by common sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as Flash, ROM, RAM, SRAM, DRAM or other storage technologies.

Other components not shown in FIG. 4 are contemplated by the present disclosure. For instance, the communication device 400 can include a reset button (not shown). The reset button can be used to reset the controller 406 of the communication device 400. In yet another embodiment, the communication device 400 can also include a factory default setting button positioned below a small hole in a housing assembly of the communication device 400 to force the communication device 400 to re-establish factory settings. In this embodiment, a user can use a protruding object such as a pen or paper clip tip to reach into the hole and depress the default setting button.

The communication device 400 as described herein can operate with more or less components described in FIG. 4 to accommodate implementations of the devices described by the present disclosure. These variant embodiments are contemplated by the present disclosure.

Figure 5:
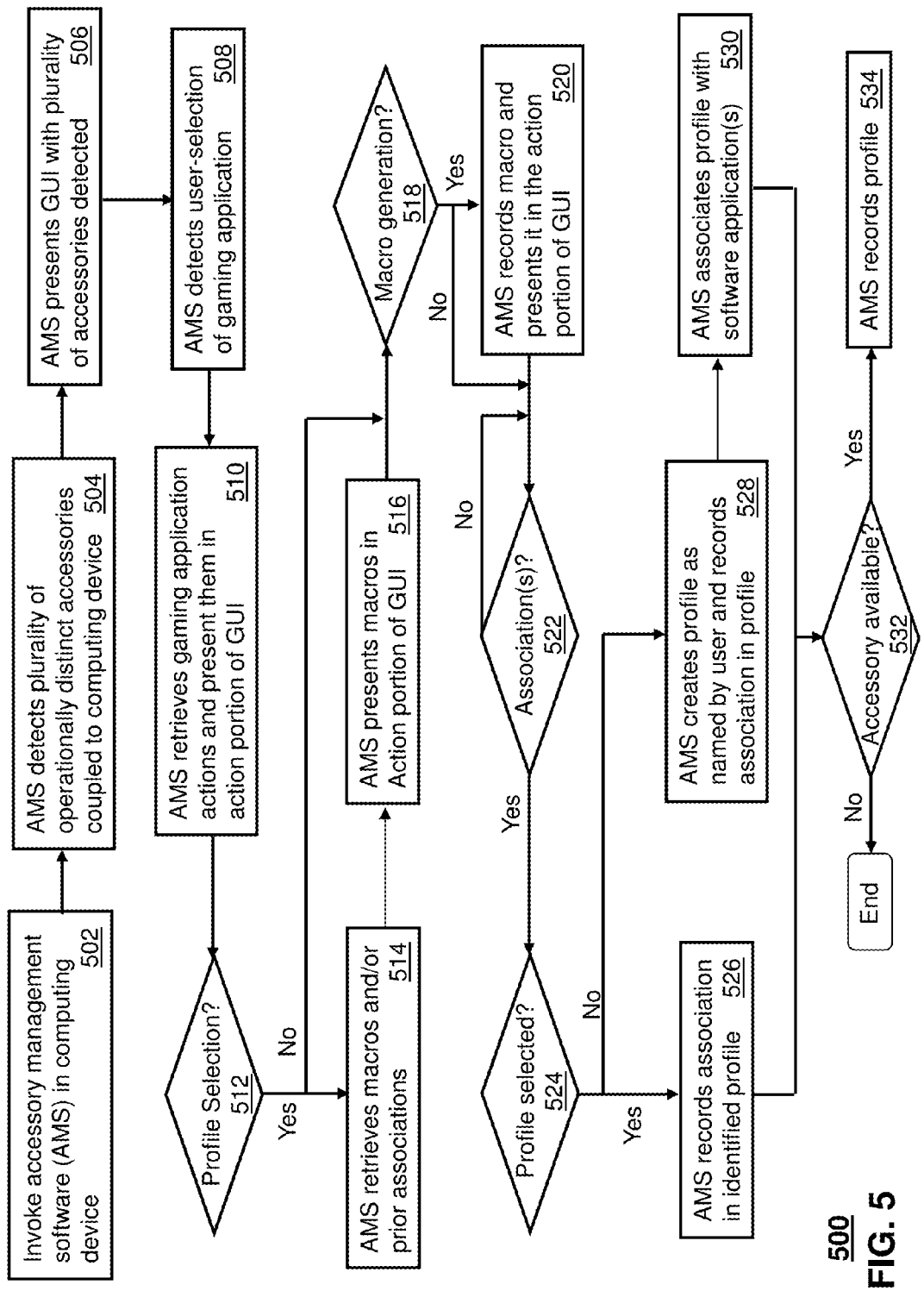
FIGS. 5-7 depict processes describing illustrative embodiments of the AMS application.
Figure 6:
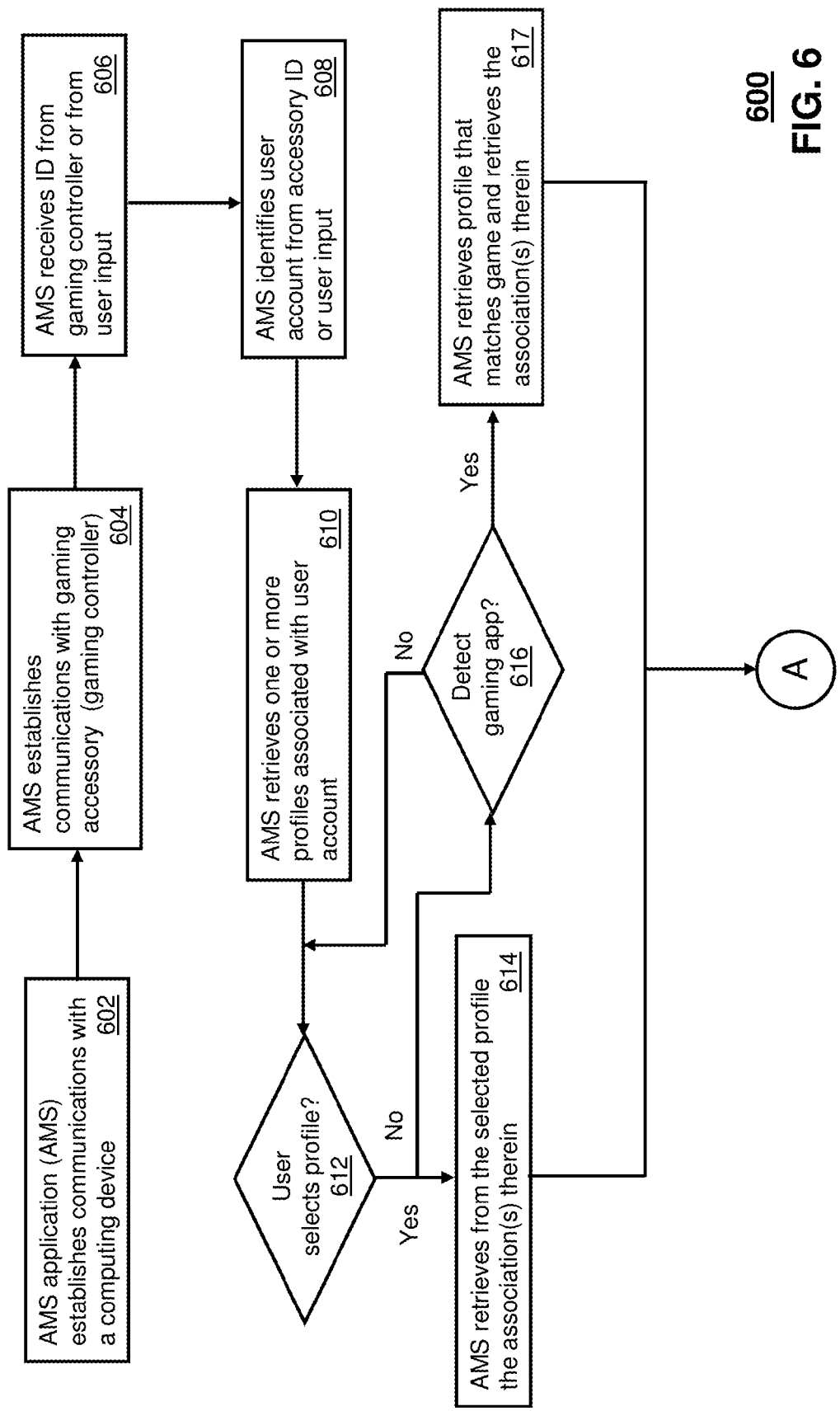
Figure 7:
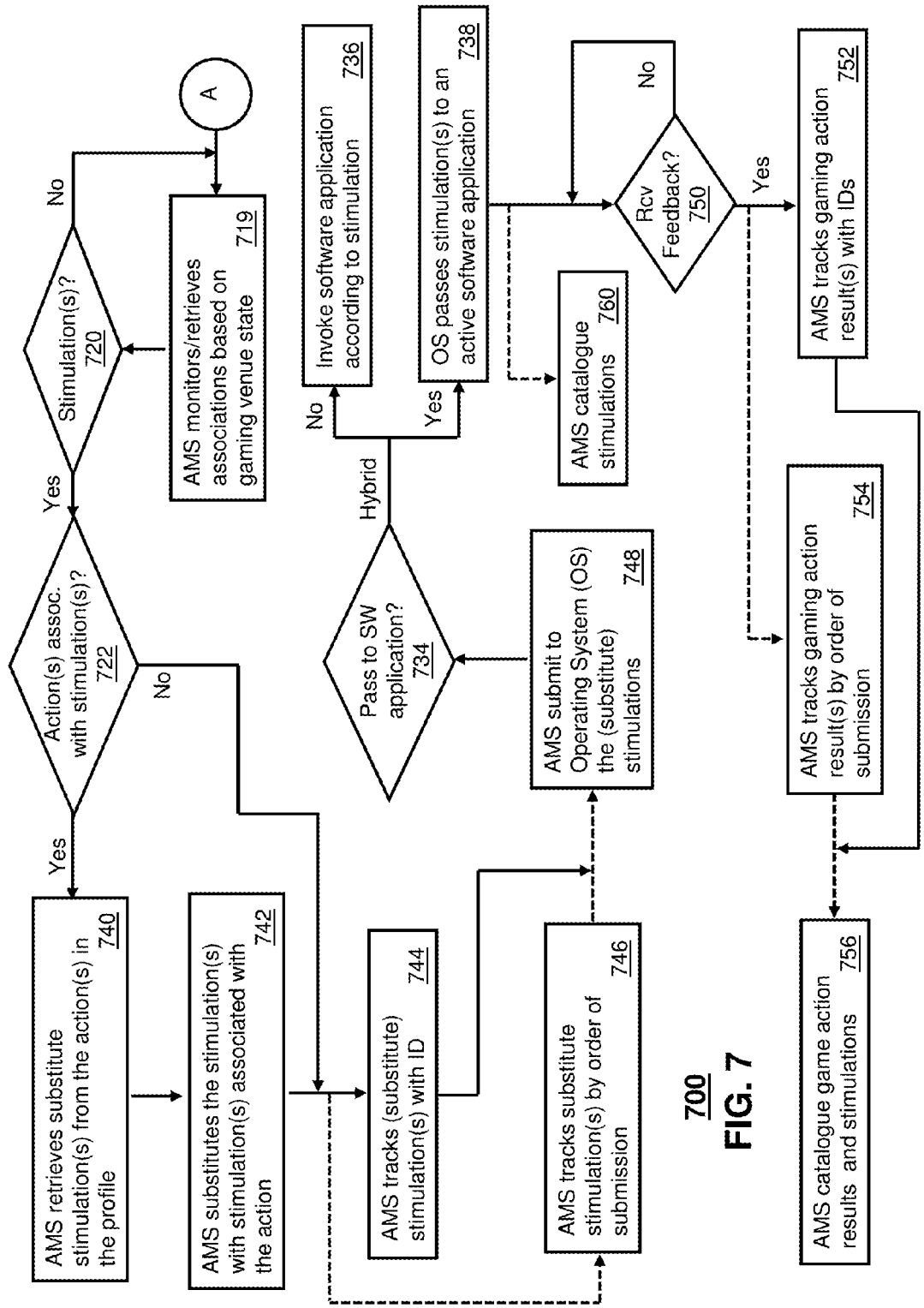

FIGS. 5-7 depict processes 500-700 describing illustrative embodiments of the AMS application. A first process 500 can begin with step 502 in which the AMS application is invoked in a computing device. The computing device can be a remote server (not shown), the gaming console 206 of FIGS. 2-3, or any other computing device with suitable computing resources. The invocation step can result from a user selection of the AMS application from a menu or iconic symbol presented on a desktop of the computing device by an operating system (OS) managing operations thereof. In step 504, the AMS application can detect by way of drivers in the OS multiple operationally distinct accessories communicatively coupled to the computing device. The accessories can be coupled to the computing device by a tethered interface (e.g., USB cable), a wireless interface (e.g., Bluetooth or Wireless Fidelity—WiFi), or combinations thereof.

In the present context, an accessory can represent any type of device which can be communicatively coupled to the computing device (or an integral part of the computing device) and which can control aspects of the OS and/or a software application operating in the computing device. An accessory can represent for example a keyboard, a touch screen display, a gaming pad, a gaming controller, a tablet, a mouse, a joystick, a paddle, a steering wheel, pedals, a light gun, a microphone, or a headset with a microphone just to mention a few.

In step 506, the AMS application presents a GUI 101 such as depicted in FIG. 1 with operationally distinct accessories such as a keyboard 108, and a gaming controller 115. The GUI 101 presents the accessories 108-116 in a scrollable section 117. One or more accessories can be selected by a user with a mouse pointer. In this illustration, the keyboard 108 and the gaming controller 115 were selected for customization. Upon selecting the keyboard 108 and the gaming controller 115 from the scrollable window of section 117, the AMS application presents the keyboard 108 and the gaming controller 115 in split windows 118, 120, respectively, to assist the user during the customization process.

In step 508, the AMS application can be programmed to detect a user-selection of a particular software application such as a game. This step can be the result of the user entering in a Quick Search field 160 the name of a gaming application (e.g., World of Warcraft™ or WoW). Upon identifying a gaming application, the AMS application can retrieve in step 510 from a remote or local database gaming application actions which can be presented in a scrollable section 139 of the GUI represented as "Actions" 130. The actions can be tactical actions 132, communication actions 134, menu actions 136, and movement actions 138 which can be used to invoke and manage features of the gaming application.

The actions presented descriptively in section 130 of the GUI can represent a sequence of accessory input functions which a user can stimulate by button depressions, navigation or speech. For example, depressing the left button on the mouse 110 can represent the tactical action "Reload", while the simultaneous keyboard depressions "Ctrl A" can represent the tactical action "Melee Attack." For ease of use, the "Actions" 130 section of the GUI is presented descriptively rather than by a description of the input function(s) of a particular accessory.

Any one of the Actions 130 can be associated with one or more input functions of the accessories being customized in windows 118 and 120 by way of a drag and drop action or other customization options. For instance, a user can select a "Melee Attack" by placing a mouse pointer 133 over an iconic symbol associated with this action. Upon doing so, the symbol can be highlighted to indicate to the user that the icon is selectable. At this point, the user can select the icon by holding the left mouse button and drag the symbol to any of the input functions (e.g., buttons) of the keyboard 108 or selectable options of the gaming controller 115 to make an association with an input function of one of these accessories. Actions of one accessory can also be associated with another accessory that is of a different category. For example, key depressions "Ctrl A" of the key board 108 can be associated with one of the buttons of the gaming controller 115 (e.g., the left button 119).

In one embodiment, a Melee Attack action can be associated by dragging this action to either the left button 119 or right button 120 of the gaming controller 115. Thus, when the selected button is depressed, the stimulus signal that is generated by the selected button of the gaming controller 115 can be substituted by the AMS application with the Melee Attack action. In another embodiment, the Melee Action can be associated with a combination of key button presses (e.g., simultaneous depression of the left and right buttons 119, 121, or a sequence of button depressions: two rapid left button depressions followed by a right button depression).

In yet another embodiment, the Melee Action can be associated with movement of the gaming controller 115 such as, for example, rapid movement or shaking of the gaming controller 115. In a further embodiment, the AMS application can be adapted to make associations with two dimensional or three dimensional movements of the gaming controller 115 according to a gaming venue state. For example, suppose the player's avatar enters a fighter jet. In this gaming venue state, moving the left navigation knob forward can be associated by the AMS application with controlling the throttle of the jet engines. Rapidly moving the gaming controller 115 downward can represent release of munitions such as a bomb.

In a gaming venue state where the gamer's avatar has entered a building, lifting of the gaming controller 115 above a first displacement threshold can be associated with a rapid movement of the avatar up one floor. A second displacement threshold can be associated with a rapid movement of the avatar down one floor—the opposite of the first displacement threshold. Alternatively, the second displacement threshold could be associated with a different action such as jumping between buildings when the avatar is on the roof of a building.

The AMS application can associate standard stimuli generated by manipulating a gaming accessory with substitute stimuli that control gaming actions of a video game. The AMS application can be adapted to perform these associations based on a gaming venue state such as the ones described above. Accordingly, the associations made between stimuli supplied by an accessory such as the gaming controller 115 can be venue state dependent. The gaming venue state can be a description of a gaming state (e.g., entering a tank which requires the use of gaming controls for a tank), captured images of the gaming venue state (e.g., one or more still images of a tank, or a video of an avatar entering a tank), and/or application programming instructions (API) messages which can be received from the gaming application to enable the AMS application to identify the occurrence of a particular gaming venue state.

At step 512 the AMS application can also respond to a user selection of a profile. A profile can be a device profile or master profile invoked by selecting GUI button 156 or 158, each of which can identify the association of gaming actions with input functions of one or more accessories. If a profile selection is detected in step 512, the AMS application can retrieve in step 514 macro(s) and/or prior associations defined by the profile. The actions and/or macros defined in the profile can also be presented in step 516 by the AMS application in the actions column 130 of the GUI 101 to modify existing profile associations or create new associations.

In step 518, the AMS application can also respond to a user selection to create a macro. A macro in the present context can mean any actionable command which can be recorded by the AMS application. An actionable command can represent a sequence of stimuli generated by manipulating input functions of an accessory, a combination of actions in the Action section 130, an identification of a software application to be initiated by an operating system (OS), or any other recordable stimulus to initiate, control or manipulate software applications. For instance, a macro can represent a user entering the identity of a software application (e.g., instant messaging tool) to be initiated by an OS upon the AMS application detecting through speech recognition a speech command.

A macro can also represent recordable speech delivered by a microphone singly or in combination with a headset for detection by another software application through speech recognition or for delivery of the recorded speech to other parties. In yet another embodiment a macro can represent recordable navigation of an accessory such as a joystick of the gaming controller 115, recordable selections of buttons of the gaming controller 115, and so on. Macros can also be combinations of the above illustrations with selected actions from the Actions 130 menu. Macros can be created from the GUI 101 by selecting a "Record Macro" button 148. The macro can be given a name and category in user-defined fields 140 and 142.

Upon selecting the Record Macro button 148, a macro can be generated by selection of input functions on an accessory (e.g., Ctrl A, speech, navigation knob movements of the gaming controller 115, etc.) and/or by manual entry in field 144 (e.g., typing the name and location of a software application to be initiated by an OS, such as an instant messaging application, keyboard entries such as Ctrl A, etc.). Once the macro is created, it can be tested by selecting button 150 which can repeat the sequence specified in field 144. The clone button 152 can be selected to replicate the macro sequence if desired. Fields 152 can also present timing characteristics of the stimulus sequence in the macro with the ability to modify and thereby customize the timing of one or more stimulations in the stimulus sequence. Once the macro has been fully defined, selection of button 154 records the macro in step 520. The recording step can be combined with a step for adding the macro to the associable items Actions column 130, thereby providing the user the means to associate the macro with input functions of the accessories (e.g., one or more keys of the keyboard 108, buttons of the gaming controller 115, etc.).

In step 522, the AMS application can respond to drag and drop associations of actions and input functions of the keyboard 108 or the gaming controller 115. Associations can also be made based on the two or three dimensional movements of the gaming controller 115. If user input indicates that a user is performing an association, the AMS application can proceed to step 524 where it can determine if a profile has been identified in step 512 to record the association(s) detected. If a profile has been identified, the associations are recorded/stored in the profile in step 526. If a profile has not been identified in step 512, the AMS application can create a profile in step 528 for recording the detected associations. In the same step, the user can name the newly created profile as desired. The newly created profile can also be associated with one or more gaming software applications in step 530 for future reference. The AMS application can also record in a profile in step 526 associations based on gaming venue states. In this embodiment the same stimuli generated by the gaming controller 115 can result in different substitutions based on the gaming venue state detected by the AMS application.

The AMS application can be adapted to utilize image processing technology to detect a gaming venue state according to pre-stored images or video clips stored in the profile. For example, the AMS application can use image processing technology to identify an avatar of a gamer and track what the avatar does as directed by the gamer. For example, if the avatar enters a tank, the image processing technology of the AMS application can detect a gaming venue state associated with the use of a tank, and thereby identify associations between accessory stimuli and substitute stimuli according to the detected gaming venue state.

Referring back to step 526, once the associations have been recorded in a profile, the AMS application can determine in step 532 which of the accessories shown illustratively in FIGS. 1-3 are programmable and available for programming. If the AMS application detects that the accessories (e.g., keyboard 108, gaming controller 115) are communicatively coupled to a computing device from which the AMS application is operating (e.g., gaming console 206)

and programmable, the AMS application can proceed to step 534 of FIG. 5 where it submits the profile and its contents for storage in one of the accessories (e.g., the gaming controller 115 in FIGS. 2-3) or the dongle 203. Once the gaming controller 115, dongle 203, or combinations thereof are programmed with the profile, such devices can perform stimuli substitutions according to the associations recorded by the AMS application in the profile. Alternatively, the AMS application can store the profile in the computing device 206 of FIGS. 2-3 and perform substitutions of stimuli supplied by the gaming controller 115 according to associations recorded in the profile by the AMS application.

The GUI 101 of FIG. 1 presented by the AMS application can have other functions. For example, the GUI 101 can provide options for layout of the accessory selected (button 122), how the keyboard is illuminated when associations between input functions and actions are made (button 134), and configuration options for the accessory (button 126). The AMS application can adapt the GUI 101 to present more than one functional GUI page. For instance, by selecting button 102, the AMS application can adapt the GUI 101 to present a means to create macros and associate actions to accessory input functions as depicted in FIG. 1. Selecting button 104 can cause the AMS application to adapt the GUI 101 to present statistics from stimulation information and/or gaming action results captured by the AMS application. Selecting button 106 can also cause the AMS application to adapt the GUI 101 to present promotional offers and software updates.

The steps of process 500 in whole or in part can be repeated until a desirable pattern is achieved of associations between stimulus signals generated by accessories and substitute stimuli. It would be apparent to an artisan with ordinary skill in the art that there can be numerous other approaches to accomplish the embodiments described by process 500 or variants thereof. These undisclosed approaches are contemplated by the present disclosure.

FIG. 6 depicts another process 600 for illustrating the operations of the AMS application for either of the configurations shown in FIGS. 2-3. In the configurations of FIGS. 2-3, the AMS application can be operating in whole or in part from the gaming controller 115, the dongle 203, the gaming console 206, a remote server (not shown), or a computing device such as a desktop computer (also not shown). For illustration purposes, it is assumed the AMS application operates from the gaming console 206. The process 600 can begin with the AMS application establishing communications in steps 602 and 604 between the gaming console 206 and a gaming accessory such as the gaming controller 115, and a headset 114 such as shown in FIG. 1. These steps can represent for example a user starting the AMS application from the gaming console 206 and/or the user inserting at a USB port of the gaming console 206 a connector of a USB cable tethered to the gaming controller 115, which invokes the AMS application. In step 606, the gaming controller 115 and/or headset 114 can in turn provide the AMS application one or more accessory ID's, or the user can provide by way of a keyboard or the gaming controller 115 user identification. With the accessory ID's, or user input the AMS application can identify in step 608 a user account associated with the gaming controller 115 and/or headset 114. In step 610, the AMS application can retrieve one or more profiles associated with the user account.

In step 612, the user can be presented by way of a display coupled to the gaming console 206 profiles available to the user to choose from. If the user makes a selection, the AMS application proceeds to step 614 where it retrieves from the selected profiles the association(s) stored therein. If a selection is not made, the AMS application can proceed to step 616 where it can determine whether a software gaming application (e.g., video game) is operating from the gaming console 206 or whether the gaming console 206 is communicating with the software gaming application by way of a remote system communicatively coupled to the gaming console 206 (e.g., on-line gaming server(s) presenting, for example, World of Warcraft™). If a gaming software application is detected, the AMS application proceeds to step 617 where it retrieves a profile that matches the gaming application detected and the association(s) contained in the profile. As noted earlier, association(s) can represent accessory stimulations, navigation, speech, the invocation of other software applications, macros or other forms of suitable associations that result in substitute stimulations. The accessory stimulations can be stimulations that are generated by the gaming controller 115, as well as stimulations from other accessories (e.g., headset 114), or combinations thereof.

Once a profile and its contents have been retrieved in either of steps 614 or step 617, the AMS application can proceed to step 719 of FIG. 7 where it monitors for a change in a gaming venue state based on the presentations made by the gaming application, or API messages supplied by the gaming application. At the start of a game, for example, the gaming venue state can be determined immediately depending on the gaming options chosen by the gamer. The AMS application can determine the gaming venue state by tracking the gaming options chosen by a gamer, receiving an API instruction from the gaming application, or by performing image processing on the video presentation generated by the gaming application. For example, the AMS application can detect that the gamer has directed an avatar to enter a tank. The AMS application can retrieve in step 719 associations for the gaming controller 115 for controlling the tank.

The AMS application can process movements of the gaming controller 115 forwards, backwards, or sideways in two or three dimensions to control the tanks movement. Similarly, rotating the gaming controller 115 or tilting the gaming controller 115 forward can cause an accelerometer, gyro or magnetometer of the gaming controller 115 to provide navigational data to the AMS application which can be substituted with an action to cause the tank to turn and/or move forward. The profile retrieved by the AMS application can indicate that the greater the forward tilt of the gaming controller 115, the greater the speed of the tank should be moving forward. Similarly, a rear tilt can generate navigation data that is substituted with a reverse motion and/or deceleration of the forward motion to stop or slow down the tank. A three dimensional lift of the mouse can cause the tank to steer according to the three dimensional navigation data provided by the gaming controller 115. For example, navigation data associated with a combination of a forward tilt and right bank of the gaming controller 115 can be substituted by the AMS application to cause an increase in forward speed of the tank with a turn to the right determined by the AMS application according to a degree of banking of the gaming controller 115 to the right. In the above embodiment, the three dimensional navigation data allows a gamer to control any directional vector of the tank including speed, direction, acceleration and deceleration.

In another illustration, the AMS application can detect a new gaming venue state as a result of the gamer directing the avatar to leave the tank and travel on foot. Once again the AMS application retrieves in step 719 associations related to the gaming venue state. In this embodiment, selection of buttons of the gaming controller 115 can be associated by the AMS application with weaponry selection, firing, reloading and so on. The movement of the gaming controller 115 in two or three dimensions can control the direction of the avatar and/or selection or use of weaponry. Once the gaming venue state is detected in step 719, the AMS application retrieves the associations related to the venue state, and can perform substitutions of stimuli generated by the gaming controller 115, and/or speech commands received by microphone of the headset 114.

The AMS application can monitor in step 720 stimulus signals generated by the accessories coupled to the gaming console 206. For example, the stimulus signals can be generated by the gaming controller 115 in response to a gamer manipulating the gaming controller 115, and/or by generating speech commands detected by the headset 114. If a simulation is detected at step 720, the AMS application can determine in step 722 whether to forward the detected stimulation(s) to an Operating System (OS) of the gaming console 206 without substitutions. This determination can be made by comparing the detected stimulus signal(s) to association(s) in the profile. If the detected stimulus signal(s) match the association(s), then the AMS application proceeds to step 740 where it retrieves substitute stimulus signal(s) in the profile. In step 742, the AMS application can substitute the detected stimulus signal(s) with the substitute stimulus signal(s) in the profile. In one embodiment, the AMS application can track in step 744 the substitute stimulus signals by updating these stimulus signals with a unique identifier such as a globally unique identifier (GUID). In this embodiment, the AMS application can also add a time stamp to each substitute stimulus to track when the substitution was performed.

In another embodiment, the AMS application can track each substitute stimulus signal according to its order of submission to the gaming application. For instance, sequence numbers can be generated for the substitute stimulus signals to track the order in which they were submitted to the gaming application. In this embodiment, the substitute stimulus signals do not need to be updated with sequence numbers or identifiers so long as the order of gaming action results submitted by the gaming application to the AMS application remain in the same order as the substitute stimulus signals that were originally submitted.

For example, if a first stimulus signal sent to the gaming application by the AMS application is a command to shoot, and a second stimulus signal sent to the gaming application is a command to shoot again, then so long as the gaming application provides a first a game action result for the first shot, followed by a game action result for the second shot, then the substitute stimulus signals will not require updating with sequence numbers since the game action results are reported in the order that the stimulus signals were sent. If on the other hand, the game action results can be submitted out of order, then updating the stimulus signals with sequence numbers or another suitable identifier is performed to enable the AMS application to properly track and correlate stimulus signals and corresponding gaming action results.

Once the stimulus signals received in step 720 have been substituted with other stimulus signals in step 742, and the AMS application has chosen a proper tracking methodology for correlating gaming action results with stimulus signals, the AMS application can proceed to step 748 and submit the substitute stimulus signals to the OS of the gaming console 206. If in step 722 the detected stimulus signal(s) do not match an association in the profile, then the AMS application proceeds to one of steps 744 or 746 in order to track the stimulus signals of the accessory. Once the AMS application has performed the necessary steps to track the stimulus signal as originally generated by the accessory, the AMS application proceeds to step 748 where it submits stimulus signals (with or without substitutions) to the OS of the gaming console 206 with or without tracking information as previously described.

In step 734, the OS determines whether to invoke in step 736 a software application identified in the stimulation(s) (e.g., gamer says "turn on team chat," which invokes a chat application), whether to forward the received stimulus signals to the gaming software application in step 738, or combinations thereof. Contemporaneous to the embodiments described above, the AMS application can monitor in step 750 for game action results supplied by the gaming application via a defined API. The game action results can be messages sent by the gaming application by way of the API of the gaming application to inform the AMS application what has happened as a result of the stimulus signals sent in step 738. For instance, suppose the stimulus signal sent to the gaming application in step 738 is a command to shoot a pistol. The gaming application can determine that the shot fired resulted in a miss of a target. The gaming application can respond with a message which is submitted by way of the API to the AMS application that indicates the shot fired resulted in a miss. If IDs such as GUIDs were sent with each stimulus signal, the gaming application can submit game action results with their corresponding GUID to enable the AMS application to correlate the gaming action results with stimulations having the same GUID.

For example, if the command to shoot included the ID "1234," then the game action result indicating a miss will include the ID "1234," which the AMS application can use in step 752 to identify the stimulation having the same ID. If on other hand, the order of game action results can be maintained consistent with the order of the stimulus signals, then the AMS application can correlate in step 754 stimulus signals with game action results by the order in which the stimulus signals were submitted and the order in which the game action results were received. In step 756, the AMS application can catalogue stimulus signals and game action results. In another embodiment, the AMS application can be adapted to catalogue the stimulations in step 760. In this embodiment, step 760 can be performed as an alternative to steps 750 through 756. In another embodiment, step 760 can be performed in combination with steps 750 through 756 in order to generate a catalogue of stimulus signals, and a catalogue for gaming action results correlated to the stimulations.

Figure 8:
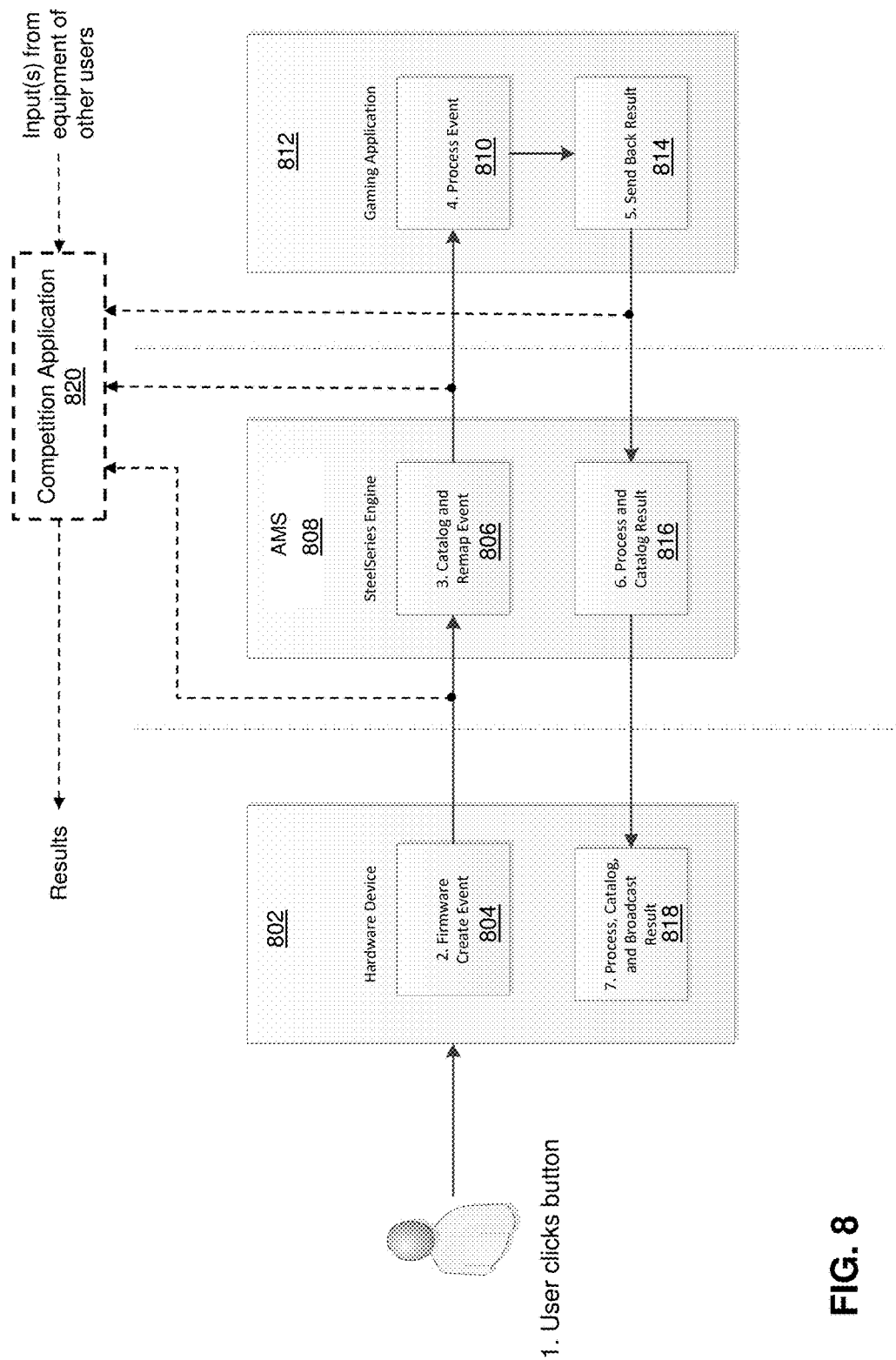
FIG. 8 depicts an illustrative embodiment of a system operating at least in part according to the processes of FIGS. 5-7.
Figure 9:
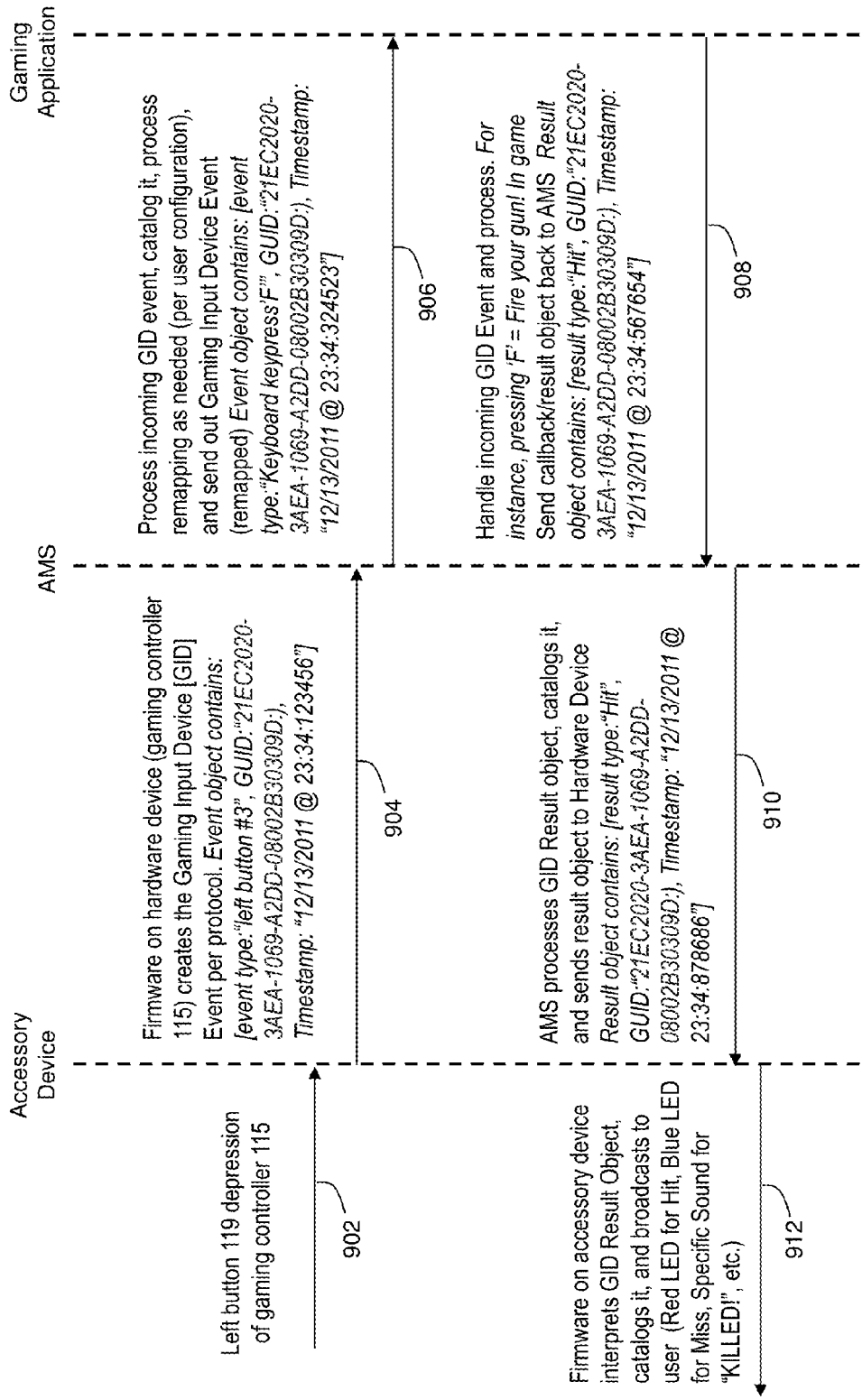
FIG. 9 depicts a flow diagram of an illustrative embodiment of a communication process utilized by the system of FIG. 8.

FIGS. 8-9 illustrate embodiments of a system with a corresponding communication flow diagram for correlating stimulus signals and gaming action results. In this illustration a user clicks the left button 119 of a hardware device 802, such as the gaming controller 115 (FIG. 1). The gaming controller 115 can include firmware (or circuitry) 804, which performs a create event function as depicted by event 2 in FIG. 8. The button depression and the event creation are depicted in FIG. 9 as steps 902 and 904. In step 904, the firmware 804 of the gaming controller 115 can, for example, generate an event type "left button #3," and a unique GUID with a time stamp, which is submitted to the AMS application. Referring back to FIG. 8, a catalog and/or remapping process 806 of the AMS application 808 catalogues event 3, and if a substitute stimulus signal has been predefined, remaps the event according to the substitution. The substitution signal associated with the remapped event is then transmitted to an event processing module 810 of the gaming application 812 at event 4. Event 3 of FIG. 8 is depicted as step 906 in FIG. 9. In this illustration, the AMS application 808 substitutes the "left button #3" depression stimulus signal with a "keyboard 'F'" depression stimulus signal, which can be interpreted by the gaming application 812 as a "fire" command. The AMS application 808 in this illustration continues to use the same GUID, but substitutes the time stamp for another time stamp to identify when the substitution took place.

Referring back to event 4, the gaming application 812 processes the event and in a reporting process module 814 sends back at event 5 a game action result to the AMS application 808, which is processed by an AMS result processing application 816 at event 6. The AMS application 808 then submits the results to an accessory result process module 818 at event 7. Events 4 and 5 are depicted as step 908 in FIG. 9. In this step, the gaming application 812 processes the stimulus signal of the "keyboard F" as an action to fire the gamer's gun, and then determines from the action the result from logistical gaming results generated by the gaming application 812.

In the present illustration, the action of firing resulted in a hit. The gaming application 812 submits to the AMS application 808 the result signal of type "Hit" with a new time stamp, while utilizing the same GUID for tracking purposes. At step 910, the AMS application 808 correlates the stimulus signal "left button #3 (and/or the substitute stimulus signal "keyboard F") to the game result "Hit" and catalogues them in memory. The AMS application 808 then submits to the accessory 802 (e.g., gaming controller 115) in step 910 the game action result signal "Hit" with the same GUID, and a new time stamp indicating when the result signal was received. Upon receiving the message from the AMS application 808, the accessory 802 in step 912 processes the "Hit" by asserting a red LED on the accessory (e.g., left button 119 illuminates in red or other LED of the gaming controller 115 illuminates in red) to indicate a hit. Other notification notices can be used such as another color for the LED to indicate misses, a specific sound for a hit, or kill, a vibration or other suitable technique for notifying the gamer of the game action result.

The system can include a competition application 820 that allows for alternative and/or supplemental competitions in addition to the gaming application 812. The competition application 820 receives one or more stimulus signals from the game controller 802 of the user. Alternatively or in addition, when the system includes the AMS application 808, the competition processor can receive one or more substitute stimulus signals from the catalog and/or remapping process 806 of the AMS application 808, when present. The competition application 820 also receives similar inputs from devices of other users, establishing a competition, contest or tournament between the equipment of two or more users. The competition application 820 provides results indicative of the competition as may be suitable for display on a display device (not shown). In at least some embodiments, the competition application 820 receives a game action result from the reporting process module 814. The competition processor can modify one or more of the stimulus signal, the substitute stimulus signal, or measures derived from one or more of the stimulus signal and the substitute stimulus signal. It is further possible for one or more such competitions to be established by the competition application 820 based on one or more of the game action result the stimulus signal, the substitute stimulus signal and combinations thereof.

In an embodiment where the AMS application 808 receives gaming results from a gaming application 812 via an API as described above, the communication flow diagram shown in FIG. 9 can be modified with a more comprehensive protocol that includes a weapon type being monitored, misses, non-kill hits (i.e., a hit that does not result in a kill), kill hits, and loss of life rate.

Each of the AMS application 808 and the competition application 820 can present performance factors of each gamer, and the type of weapons being tracked (e.g., sniper rifle, machine gun, hand gun). To identify which weapon is being used at any point in time during a gaming session, either of the AMS application 808 and the competition application 820 can highlight the weapon in a distinguishable color such as blue while keeping all other weapon rows in gray. The AMS application 808 or the competition application 820 can calculate an average hit rate from the misses, non-kill hits, and kill hits. The AMS application 808 or the competition application 820 can compare gaming action results between the gamers to identifying leading performance factors as shown in the "Comp Rating" column of each player. In a tournament setting, such performance factors can be shown in side-by-side monitors, or together in a JumboTron™ display such as those used in sporting events or the like.

As the gamer is competing, the input functions of the gaming controller 115 can be highlighted and moved (in the case of knobs) to show the audience how the gaming controller 115 is being used by the gamer. The health of the gamer's avatar can be shown below the gaming controller 115.

In an embodiment where the gaming application does not provide gaming action results (e.g., the video gaming application does not provide an API), either or both of the AMS application 808 and the competition application 820 can be adapted to present a gamer's performance based on the stimulus signals generated, and where applicable, the substitute stimulus signals submitted to the gaming application. The performance of the gamers can be presented according to the type of weapons used, the key depressions invoking substitutions, the macros invoked, and the rate of transmission of stimuli to the gaming application.

For example, for gamer #1, the simultaneous depression of the up and down arrows invoked the macro team chat, while using the sniper rifle. The gamer shot the rifle 14 times with 4 shots in rapid succession. Upon depressing the left "1" button of a front section of the gaming controller 115 of gamer #1, the AMS application invoked substitute stimuli transmitted to the gaming application which switches the use of the sniper rifle to the machine gun. A subsequent depression of the same button can cause a substitute stimuli generated by the AMS application to return to the sniper rifle. A depression of the right "1" button by gamer #1 resulted in substitute stimuli generated by the AMS application to call for air support. Gamer #2 shows that s/he has not invoked substitute stimuli for the machine gun. This may be because the gamer has not pre-programmed the AMS application to associate stimuli generated by the gaming controller 115 with substitute stimuli, or because the gamer has chosen not to invoke substitute stimuli with a particular key depression (or sequence of key depressions).

In at least some embodiments, monitoring one or more of stimuli generation and substitutes can be used to rate players' performances. For example, a gamer that has a tendency to perform rapid fire on a machine gun without saving ammunition may be viewed as a poor game tactic. Comparing such statistics between gamers can be used to show performance lead factors between the gamers.

Figure 10:
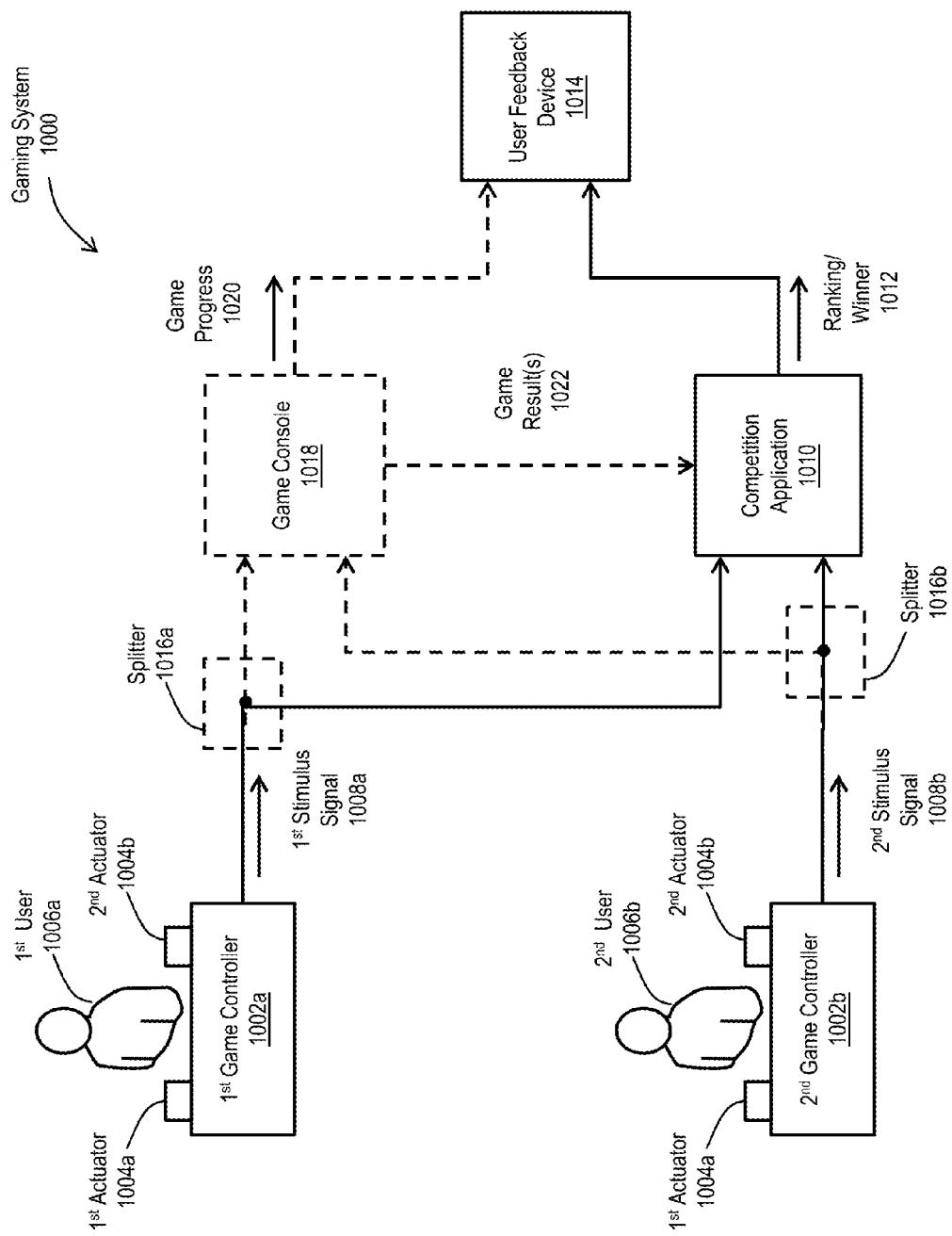
FIG. 10 depicts a functional block diagram of an illustrative embodiment of a gaming system enabling competitions based on gaming controller proficiencies.

FIG. 10 illustrates a block diagram of an example of a gaming system 1000. The gaming system 1000 includes a first user device, such as a first game controller 1002*a* having a first actuator 1004*a* that can be manipulated by a first user 1006*a*. The gaming system 1000 also includes at least a second user device, such as a second game controller 1002*b*, also having a first actuator 1004*a* and a second actuator 1004*b* that can be manipulated by a second user 1006*b*. It is understood that in at least some embodiments, either of the first and second game controllers 1002*a*, 1002*b* (generally 1002) can include a single actuator 1004, or more than two actuators 1004. It is also understood that the first and second game controllers 1002*a*, 1002*b* can be identical or different. In at least some embodiments, the first game controller 1002*a* is shared between the first and second users 1006*a*, 1006*b*.

The gaming system 1000 also includes a competition application 1010 in communication with each of the first and second game controllers 1002. The competition application 1010 can be implemented as a separate device, e.g., in some respects, similar to a second game console. Alternatively or in addition, one or more aspects of the competition application 1010 can be included in one or more other devices, such as the game controller 1018 and/or the AMS application 808 (FIG. 8), when present. It is also understood that the competition application 1010 can be implemented as a unitary device, or in a distributed manner Distributed architectures can include client-server implementations.

In operation, the competition application 1010 receives a first stimulus signal 1008*a* from the first game controller 1002*a* and a second stimulus signal 1008*b* from the second game controller 1008*b*. The first stimulus signal 1008*a* is representative of a first input function of the first game controller 1002*a*. Likewise, the second stimulus signal 1008*b* is representative of a second input function of the second game controller 1002*b*. Each of the first and second input functions can result from manipulation of one or more of the first and second actuators 1004*a*, 1004*b* (generally 1004) by a respective first and second user 1006*a*, 1006*b* (generally 1006) of the respective first and second game controllers 1002*a*, 1002*b* (generally 1002). The competition application 1010, in turn, is in further communication with a user feedback device 1014. The competition application 1010 provides an output signal to the user feedback device 1014 indicative of progression and/or results of a contest, competition or tournament. By way of example, an output signal identifies a ranking or winner signal 1012 providing an indication of a rank or winner of a competition.

In at least some embodiments the gaming system 1000 optionally includes a game console 1018 (shown in phantom). The game console 1018 also receives the first stimulus signal 1008*a* from the first game controller 1002*a* and the second stimulus signal 1008*b* from the second game controller 1008*b*. It is conceivable that in at least some embodiments contests can be established between contestants based on the stimulus signals, without actually forwarding any such stimulus signals to the game controller 1002*b*. For example, game controllers 1002 can be connected directly to the competition application 1010, as shown.

When a game console 1018 is included, a first signal splitter 1016*a* can be positioned between the first game controller 1002*a* and each of the competition application 1010 and the game console 1018. The first signal splitter 1016*a* splits the first stimulus signal 1008*a*, allowing the first stimulus signal 1008*a* to be simultaneously delivered to each of the competition application 1010 and the game console 1018. Likewise, a second signal splitter 1016*b* can be positioned between the second game controller 1002*b* and each of the competition application 1010 and the game console 1018. Such splitters 1016*a*, 1016*b* are not necessary for wireless connections, as the wireless protocol can be configured to allow for communications between each game controller 1002 and each of the competition application 1010 and the game console 1018.

The first and second stimulus signals 1008*a*, 1008*b* can be applied to actions and events occurring within a progression of a game, producing corresponding first and second gaming action results. An indication of game progress 1020, for example, including the first and second gaming action results, is provided to the user feedback device 1014. In at least some embodiments, the first and second gaming action results 1022 are provided to the competition application 1010.

The first and second game controllers 1002 can be any of the gaming controllers 115 disclosed herein and equivalents thereto. For example, the first and second gaming controllers 1002 can include one or more of keyboards, mice, trackballs, joysticks, tablets, touch pads, touch screens, paddles, steering wheels, yolks, motion sensors, microphones, light guns, and the like. The first and second actuators 1004*a*, 1004*b* can include any type of button, key button, alphanumeric key, switch disclosed herein, including equivalents thereto. The game console 1018 can include any of the gaming platforms disclosed herein and equivalents thereto, such as a gaming console, a remote server, or a computing device, such as a desktop computer. In one embodiment, the competition application 1010 can be an integral part of the game console 1018. The user feedback device 1014 can include any of the display devices disclosed herein and equivalents thereto, such as monitors, televisions, desktop computers, laptop computers, tablet computers, e-readers, media players, smart or multi-feature phones, and the like.

One or more of the first and second game controllers 1002 can be in direct communication with the competition application 1010 through a cable, such as a universal serial bus cable, PS2, audio, etc. Alternatively or in addition, one or more of the first and second game controllers 1002 can be in networked communication with the competition application 1010 through a suitable network. Examples of such networks include local area networks, such as Ethernet, wireless personal area networks, such as Bluetooth® personal area networks, wireless local area networks, such as networks subscribing to various Institute of Electrical and Electronic Engineers (IEEE) 802.11 protocols, e.g., WiFi®, broadband networks, including TCP/IP networks, the Internet and the world wide web, and combinations of one or more such networks.

Figure 11:
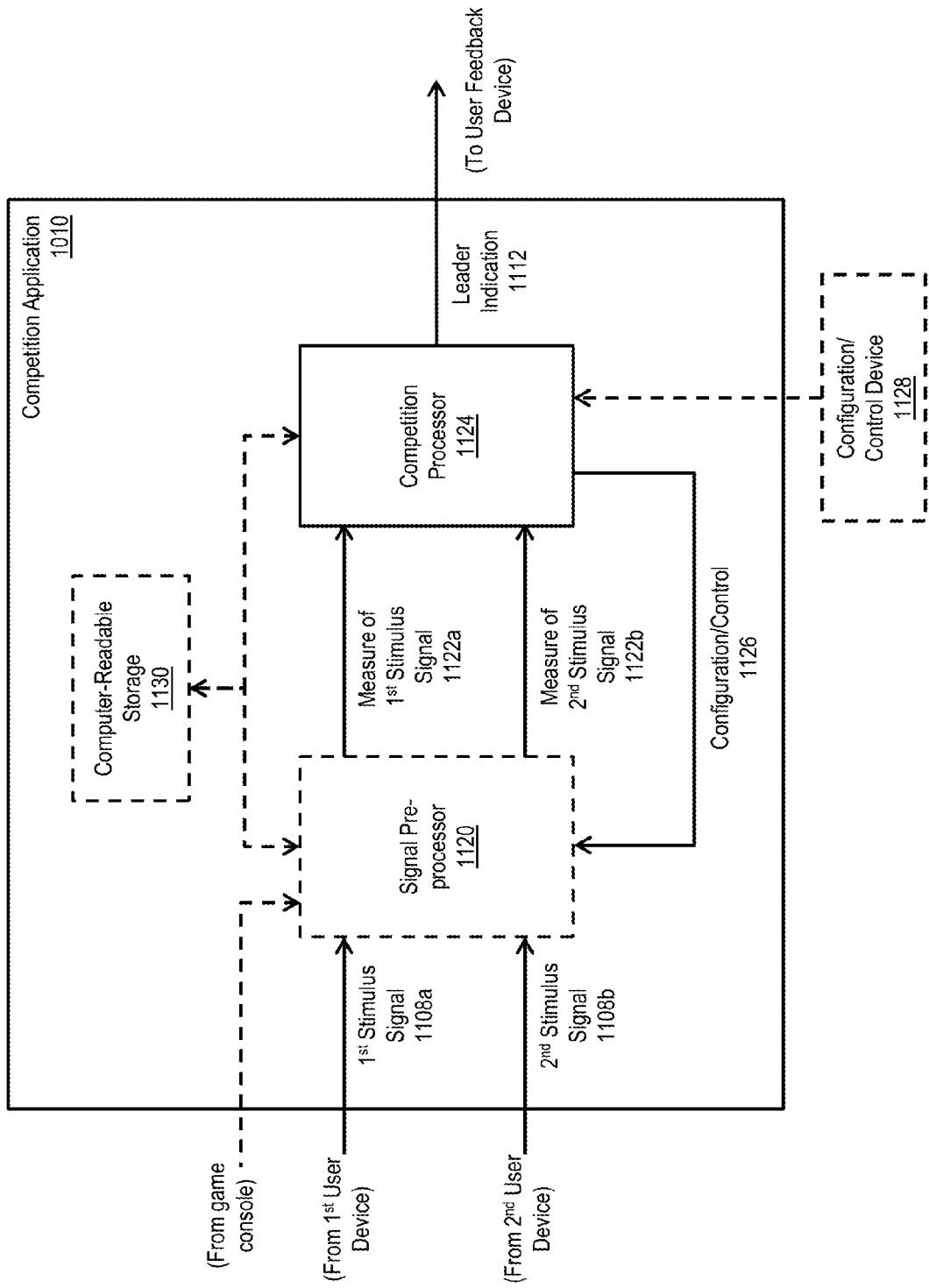
FIG. 11 depicts in more detail a functional block diagram of an illustrative embodiment of the competition system of FIG. 10.

FIG. 11 depicts in more detail a functional block diagram of an embodiment of a competition application 1010 usable within the gaming system 1000 (FIG. 10). The competition application 1010 includes a competition processor 1124, and in at least some embodiments, one or more of a stimulus signal pre-processor 1120 and/or a computer-readable storage device 1130 (both shown in phantom). The stimulus signal pre-processor 1120 receives the first stimulus signal 1108*a* from the first user game controller 1002*a* (FIG. 10) and the second stimulus signal 1108*b* from the second user device 1002*b*. The signal pre-processor 1120 processes receives stimulus signals 1108*a*, 1108*b* (generally 1108), producing a first measure of the first stimulus signal 1122*a* and a second measure of the second stimulus signal 1122*b*.

In at least some embodiments, the signal pre-processor 1120 receives an input from the game console 1018. The input from the game console 1018 can provide a respective game action result associated with each the first and second stimulus signals 1108. The game action result can be used to modify or otherwise filter a respective one of the stimulus signals 1108. Such modification of the stimulus signals 1108 can be used in generation of the measures of stimulus signals 1122a, 1122b (generally 1122). By way of example, a stimulus signal 1108 indicative of a "fire" command in a particular game application can be modified by a game action result to filter or otherwise characterize a particular measure of a stimulus signal 1122 as being a hit or a miss. Thus, the contestant's performance is measured according to the stimulation signal modified by a game action result—not the game action result itself.

In at least some embodiments, a control device 128 is provided in communication with the competition processor 1124. The control device 1128 can be used to provide user input to the competition application 1010 to configure or otherwise control one or more aspects of a competition. Such configurations or controls can include establishment of a competition. Establishment of a competition can include identification of one or more measures of stimulus signal to be determined by the signal pre-processor 1120 and compared by the competition processor 1124. Establishment of the competition can also include identification of one or more contestants, timing of the event, e.g., start and stop times, levels of proficiency, and any other suitable parameter usable to support, describe or otherwise identify such competitions.

The competition processor 1124 can provide a control signal to the signal pre-processor 1120, as shown. The control signal can include one or more user inputs received from the control device 1128 as they pertain to pre-processing of the stimulus signals 1108. Alternatively or in addition, the control signals can include modified instructions as determined by the competition processor 1124 responsive to user inputs received from the control device 1128. For example, a user may instruct the competition application to establish a competition to determine: a player with the fastest movements and highest kills; a player with the fastest typing; a player with the most keyboard clicks; a player with the most tenacity to win; or a player with the lowest missed shots and highest kills. Such categories can be defined by a community of players, for example by vote or consensus.

The competition processor 1124 receives the first measure of the first stimulus single 1122a and the second measure of the second stimulus signal 1122b, and in response, produces an output indicative of the comparison. For example, the competition processor 1124 provides a leader indication signal 1112 identifying a leader among the contestants based upon the comparison of the measures of the first and second stimulus signals 1122a, 1122b.

Figure 12:
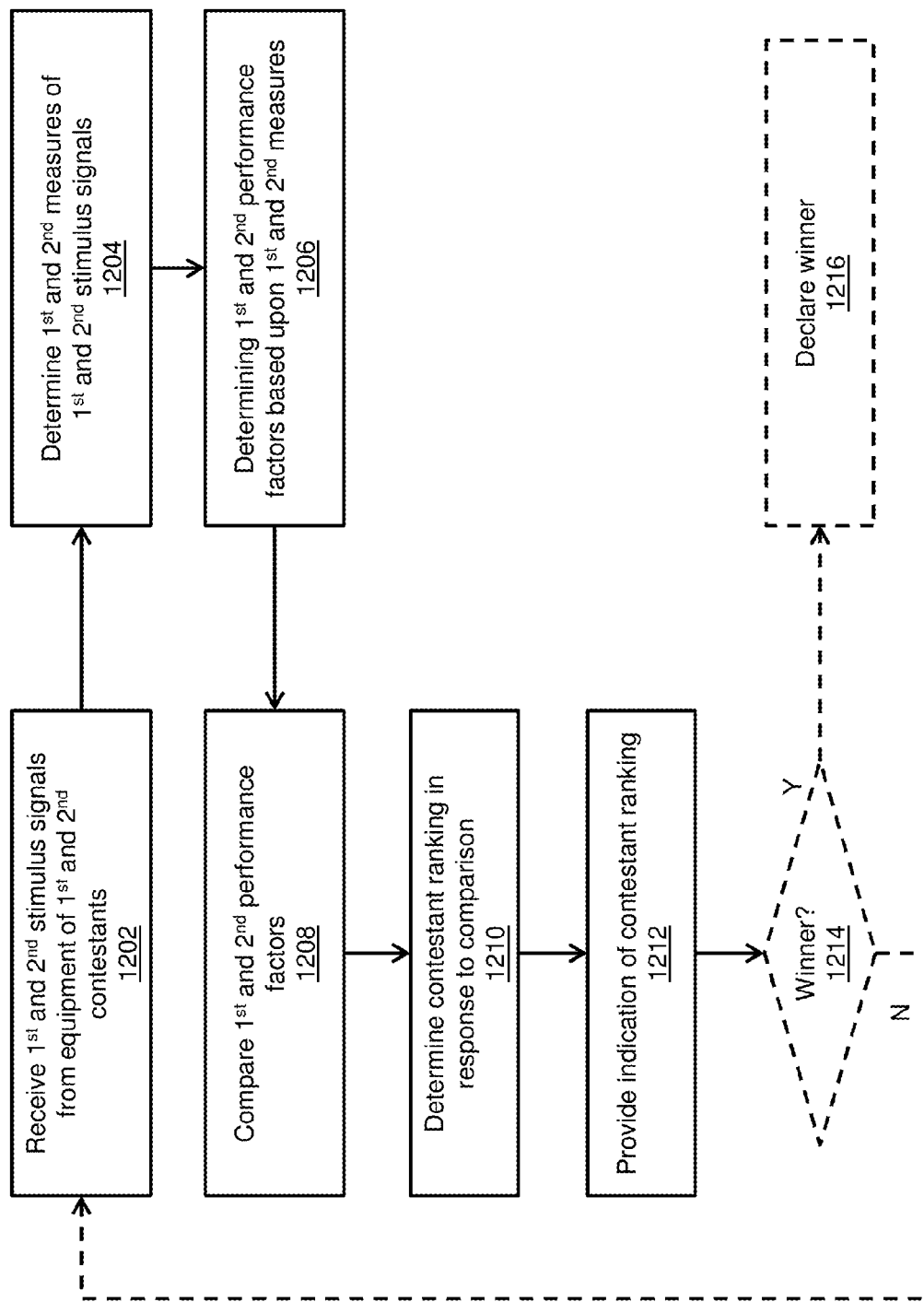
FIG. 12 depicts a flow diagram of an illustrative embodiment of a process for competing according to gaming controller proficiencies.

FIG. 12 depicts a flow diagram of an illustrative embodiment of a process 1200 for competing according to gaming controller proficiencies. At step 1202 a first stimulus signal is received from a gaming accessory used by a first contestant and a second stimulus signal is received from a gaming accessory used by a second contestant. The first stimulus signal is representative of a first input function of a first user device, such as the first gaming controller 1002a used by the first contestant and the second stimulus signal from a second user device, such as a second gaming controller 1002b used by a second contestant. When an actuator 1004 (FIG. 10), or combination of actuators 1004 of the first or second gaming controllers 1002 is activated, a stimulus signal is generated by the gaming controller 1002. When used in combination with the AMS application 808 (FIG. 8), the standard stimuli generated by manipulating a gaming accessory can be replaced with substitute stimuli that control gaming actions of a video game. In general, the stimulus signals 1008 can be generated by the gaming controller 1002, as well as by other accessories (e.g., headset), or combinations thereof. The competition application 1010 monitors stimulus signals 1008 generated by the accessories 1002 (or substitutions performed by the AMS). For example, the stimulus signals 1008 can be generated by the gaming controller 1002 in response to a gamer manipulating the gaming controller 1002.

At step 1204 determinations are made of a measure of the first stimulus signal and of a measure of the second stimulus signal. For instance, suppose the stimulus signal 1008a, such as a "left button #3" depression stimulus signal, is sent to the gaming console 1018 is a command to shoot a pistol. A gaming application hosted by the console 1018 can interpret the stimulus signal 1008a as a "fire" command, and determine that the shot fired resulted in a hit or a miss of a target within the progress of the game. The gaming application can respond with a message which is submitted by way of the API to the competition application 1010 that indicates the shot fired resulted in a hit or a miss, as the case may be.

In at least some embodiments, game action results, such as the aforementioned hit or miss result, can be used in determination of a measure of a stimulus signal. Consider the stimulus signal associated with user activation of a game controller key for firing a weapon. A user might be proficient at rapid manipulation of the controller key, but not in coordination of rapid fire with accurate aim. A game action result indicating a hit or a miss associated with each fire action can be used to modify, characterize or otherwise filter stimulus signals. For example, each stimulus signal can be stored or otherwise associated with a result, e.g., a hit or a miss, allowing for measures of the stimulus signal to account for the result. Stimulus signals can be sorted or otherwise distinguished as accurate stimulus signals, e.g., resulting in a hit, or inaccurate stimulus signals, e.g., resulting in a miss. It is important to recognize, that even though the results are used to modify or filter a stimulus signal in determining a measure, the underlying feature being used for comparison and ranking purposes of the competition is the stimulus signal of the actuation of the game controller, and not the number of hits.

By way of further example, a measure of a "rapid fire" performance indicator can be measured as a minimum time between successive actuations of a fire control button resulting in successive hits, or a maximum number of successive fire control button actuations that resulted in a hit, without any intervening misses. Such an approach allows for a comparison of a contestant's proficiency in manipulating the gaming control, modified by the game action result.

The AMS application 808 or the competition application 820 can calculate an average hit rate from the misses, non-kill hits, and kill hits. In general, a contest can be identified in which the measure of the first and second stimuli signals are identified in response to the contest. In at least some embodiments, a contest can be determined to measure gamer performance according to one or more of a number of categories related to proficiency in manipulating a gaming controller, corresponding to inputs to a game application. Examples of such contests include contests of the fastest rate of input functions, the greatest number of input functions, the most accurate input function, and so forth, and combinations of such input functions. The input functions cause generation of the stimuli signals.

At step 1206, determinations are made of a first performance factor based upon the measure of the first stimulus signal and a second performance factor based upon the measure of the second stimulus signal. At step 1208, a comparison of the first performance factor and the second performance factor is performed. The competition application 1010 can compare one or more performance factors, such as measures of stimulus signals 1008a, 1008b, between the users 1006, e.g., contestants, to identify a leading contestant of a competition. The competition application 1010 can be adapted to present a user's performance based on the stimulus signals generated, and where applicable, the substitute stimulus signals submitted to the gaming application. The performance of the contestants can be presented according to the actuations, e.g., key depressions, and/or measures derived from actuations. Examples include an actuation, such as a "left button #3" depression corresponding to a "fire" command in a game application. In this example, actuation results in a generation of a "left button #3" stimulus signal. The competition application receives the "left button #3" stimulus signal and creates a record that this signal was received at a particular time. The time can be a time in which the "left button #3" key was depressed, which in some embodiments can be included in the stimulus signal or a time at which the signal was received. Any suitable time reference can be used, such as a game time as may be determined from a start of a game, real time, such as coordinated universal time, or reference to a timing signal, such as a clock cycle of a clock signal, and the like. In general, a measure of a stimulus signal can include determination of one or more statistical features of a collection of received/observed stimulus signals. Some examples of statistics include a maximum, a total or sum, a magnitude, an average, a rate, acceleration, accuracy, and so forth.

At step 1210, a determination is made of a ranking of the first contestant and the second contestant responsive to the comparison. In at least some embodiments, monitoring one or more of stimuli generation and substitutes can be used to rate players' performances. For example, a gamer that has a superior proficiency in performing rapid manipulation of an actuator, e.g., pressing the left button #3 key, can serve as a valuable trait as it may relate to rapid fire on a machine gun in a given application. Other examples can include a maximum number of manipulations of an actuator, e.g., maximum number of left button #3 key presses within a sample period, can serve as a valuable trait as in indication of stamina or determination. Still further examples include measurement of a minimum time between successive actuations. Comparing such statistics between contestants can be used to show performance lead factors between the contestants.

Performance in the present context can mean a comparison of only stimulus signals (e.g., accessory-generated stimulus signals and/or substitute stimulus signals). This embodiment may be user-selectable (i.e., user selects stimulus analysis only) by way of a GUI presented by the competition application. A competition can be established by an independent entity, such as a sponsor, or a game coordinator. Alternatively or in addition, a competition can be established by an individual gamer, as in a challenge to another individual or a community of gamers. Still further, a competition can be established by a consensus of one or more individuals, such as the gamers themselves. Collaboration and/or communication between any of the entities involved in establishing the competition can include any suitable means of communication, including instant messaging, texting, voice and/or video communications, online voting, and the like.

At step 1212, an indication of the ranking is provided to a user feedback device. In some embodiments, the process, e.g., at least steps 1202-1212, is repeated throughout the course of a competition. Accordingly, periodic updates are provided at step 1212 of the contestant ranking during a progression of the contest. Updates can be provided in response to one or more of a receipt of stimulus signals, e.g., at step 1202, or according to a time interval, such as every 1 second, 5 seconds, 10 seconds, and so forth. When relying upon time intervals, it may be necessary to store one or more stimulus signals received during the current time interval, such that determination of the first and second measures of the first and second stimulus signals at step 1204 are determined according to the one or more stimulus signals received during the current time interval.

Figure 13:
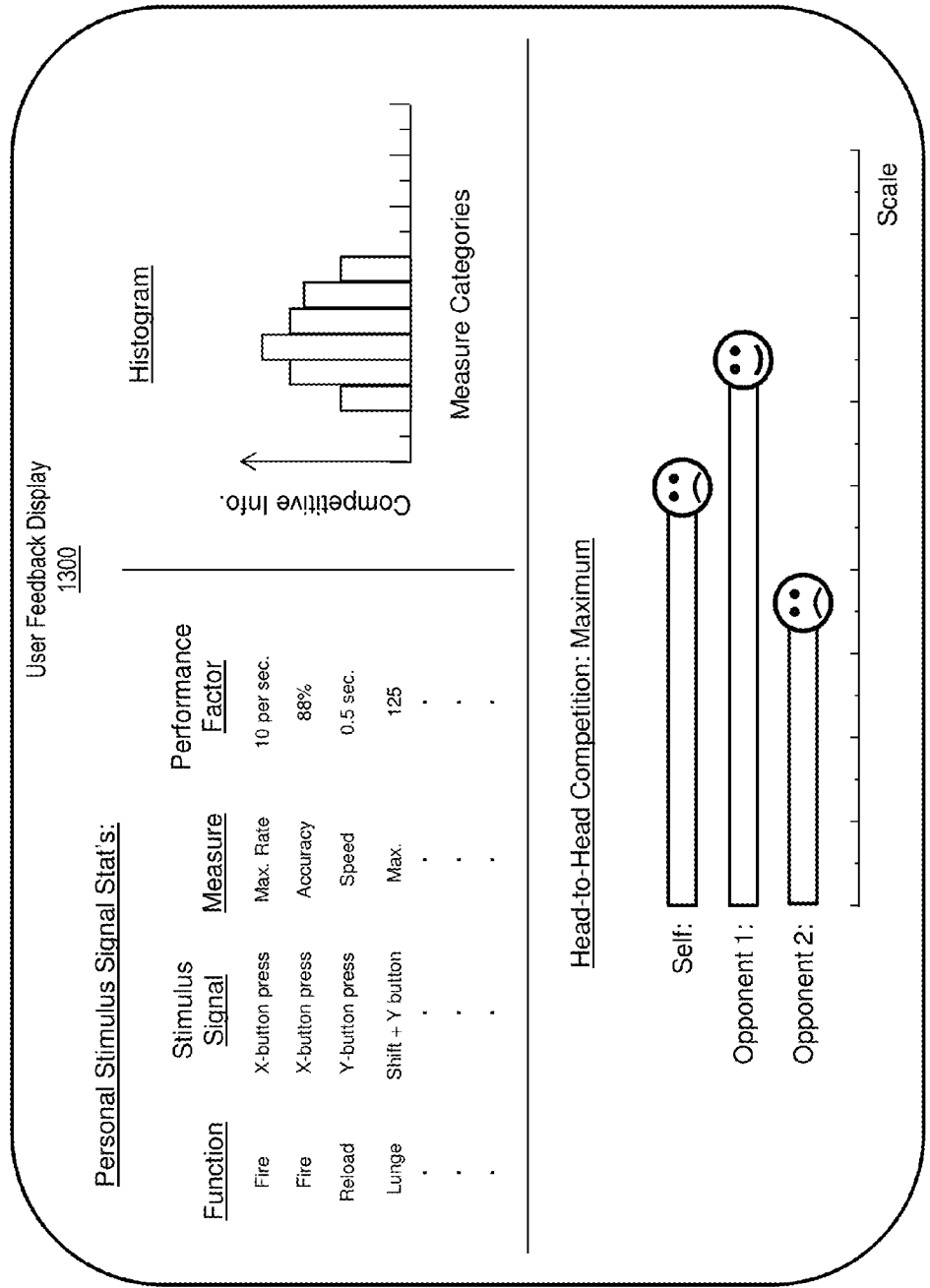
FIG. 13 depicts an illustrative embodiment of an embodiment of a user feedback display.

In at least some embodiments, configuration of a competition includes identification of criteria for winning the competition. For example, a winner can be declared as having the highest ranking at an end time of the competition, or as having achieved or surpassed a threshold performance factor. Accordingly, the process 1200 can include a determination at step 1214 (shown in phantom) whether a winner has been identified. To the extent a winner has been identified at step 1214, the winner can be declared at step 1216 (shown in phantom), for example, by providing a suitable indication at a user feedback device 1014 (FIG. 10) or user feedback display 1300 (FIG. 13). To the extent a winner has not been identified at step 1214, the process repeats starting at step 1202.

FIG. 13 depicts an illustrative embodiment of an embodiment of a user feedback display. The user feedback can include stimulus signal attributes and measures thereof for one or more players. In the illustrative example, a first column includes identification of a particular input function, e.g., a "fire" command, or a "reload" command. The next column identifies the stimulus signal, e.g., left button #3 key, or "x button." The next column identifies a measure of the function or stimulus signal, as may be defined for a particular competition. The next column identifies an example of a performance factor based on the measure of the stimulus signal.

One or more of the performance factors, can be presented graphically, for example, as a pie chart, bar chart, line chart, or histogram, as shown, to provide a visual representation of performance and to allow for performance tracking and/or to distinguish players. In at least some embodiments, the information presented in the user feedback display 1300 is updated in real time throughout progression of a competition. For example, the progression of a particular competition can be presented at the user feedback display 1300 by way of a graphical representation. The competition can identify players performance in a head-to-head fashion, such as in a "horse race" style presentation. An illustrative example includes three contestants: self, opponent 1, and opponent 2. Performance of each contestant is demonstrated by a graphical element, such as an icon that can move along a scale, such that relative location of each icon of each of the contestants provides an immediate indication of a relative ranking of the contestants at any time during the competition. A winner can be declared according to established criteria, such as achieving or surpassing a threshold value of the performance factor of the competition, or being the relative leader of the performance factor at an end of the competition as may be determined according to a time limit.

From the foregoing descriptions, it would be evident to an artisan with ordinary skill in the art that the aforementioned embodiments can be modified, reduced, or enhanced without departing from the scope and spirit of the claims described below.

For instance, one or more of the AMS application 808 and the competition application 820, 1010, 1100 can record stimulus signals and/or gaming results for a game session and store this data for an extended period of time for each of a number of gamers. In addition, one or more of the AMS application 808 and the competition application 820, 1010, 1100 can store multiple recorded game sessions for each gamer and can be adapted to compare a history of game sessions to assess how each gamer's performance has evolved. Each gamer's improvement or degradation detected by the AMS application 808 and/or the competition application 820, 1010, 1100 over a number of gaming sessions can be reported to the gamer and/or other gamers as progression line charts, histograms, pie charts or other suitable presentation techniques. The results can also be reported in a gaming tournament, on-line games, or other suitable setting.

One or more of the AMS application 808 and the competition application 820, 1010, 1100 can compare a gamer's performance in a particular game to a gaming session recorded from a prior tournament for the same game or another game. Performance in the present context can mean a comparison of only stimulus signals (e.g., accessory-generated stimulus signals and/or substitute stimulus signals). This embodiment may be user-selectable (i.e., user selects stimulus analysis only) by way of a GUI presented by the AMS application 808, or the competition application 820, 1010, 1100, or the AMS application 808 may apply this embodiment automatically in instances where the AMS application 808 does not receive gaming action results from the gaming application 812 due to a lack of an API or other suitable interface to receive gaming action results from the gaming application. Performance can also mean a comparison of only gaming action results and not stimulus signals, which can also be a user-selectable feature presented, e.g., by a GUI generated by one or more of the AMS application 808 and the competition application 820, 1010, 1100. Performance can further represent a combination of gaming action results and stimulus signals with similar data of other recorded gaming sessions. In sum, a gamer's performance can be determined from stimulus signals (with or without substitute stimulus signals), and/or gaming action results in whole or on part monitored by one or more of the AMS application 808 and the competition application 820, 1010, 1100.

For any one of the foregoing embodiments, one or more of the AMS application 808 and the competition application 820, 1010, 1100 can detect improvements or degradations in performance between a present tournament game and the previously recorded tournament game and report the results to the gamer and/or an audience of on-line gamers or a public audience at a tournament via display devices, such as monitors. The foregoing embodiments can be applied in a private setting (i.e., only visible to the gamer) and/or a social network of gamers who share and present results via the AMS application, the competition application 820, 1010, 1100 or a social network such as FaceBook™ or other suitable social network platform.

In yet other embodiments, one or more of the AMS application 808 and the competition application 820, 1010, 1100 can be adapted to compare a gamer's performance to another gamer's recorded performance. In a tournament setting, for example, the gamers' performance can be compared to each other based on the present gaming session or prior recorded sessions of the other gamer. In one embodiment, one or more of the AMS application 808 and the competition application 820, 1010, 1100 can be adapted to present a GUI where it presents a list of gamers and recorded sessions from each gamer. The GUI can enable a user to select a particular gamer and a particular recorded gaming session of the selected gamer for comparison to a recorded (or live) gaming session of the user making the selection or another gamer of interest to the user (e.g., comparing the performance of two professional gamers).

It should be noted that gaming sessions recorded by one or more of the AMS application 808 and the competition application 820, 1010, 1100 can be locally stored on a gamer's computing device (e.g., desktop computer or gaming console) or on a remote server managed by a service provider of the AMS application, or the competition application 820, 1010, 1100, or by a service provider that provides "Cloud" storing services. Comparison results can similarly be stored on a gamer's local computing device or a remote server.

In yet other embodiments, one or more of the AMS application 808 and the competition application 820, 1010, 1100 can be adapted to alert users when a particular gamer has achieved certain performance criteria established by another gamer. For instance, either or both of the AMS application 808 and the competition application 820, 1010, 1100 can respectively present a GUI to a gamer to identify performance criteria of interest (e.g., number of kill hits, average hit rate for a particular weapon, a particular ranking of a gamer for a particular gaming application, etc.). The identified performance criteria can be monitored by one or more of the AMS application 808 and the competition application 820, 1010, 1100 for the selected gamer and when one or more criteria have been achieved by the monitored gamer, either or both of the AMS application and the competition application 820, 1010, 1100 can respectively alert the interested user by suitable communication means such as email, short messaging system (SMS) text message, or a GUI of the AMS application when the interested user is engaging the AMS application.

In other embodiments, one or more of the AMS application 808 and the competition application 820, 1010, 1100 can compare the performance of the gamers to a community rating localized to users of the gaming console 206, or all or a portion of on-line users which can span a large community of users of the gaming application. For example, although an average hit rate of 5% for a sniper rifle may seem low for one gamer, when these statistics are compared to other members of a community (e.g., other professional players), either or both of the AMS application 808 and the competition application 820, 1010, 1100 can respectively determine from prior performance records of members of the community (retrieved from a local or remote database) that the user's performance is in fact above average. Similar community comparisons can be performed for the weapon type "machine gun" and "hand gun." Either or both of the AMS application 808 and the competition application 820, 1010, 1100 can also monitor and track statistics of other gaming applications, which may have different weapon types. Similar statistics can be generated and compared to the performance of members of a community to which the gamer is associated.

In at least some embodiments, statistical results can be used to identify behavioral and/or skill patterns of a gamer. For instance, suppose a gamer appears to perform well as a sniper in one gaming application and bow and arrow marksman in a different gaming application. Either or both of the AMS application 808 and the competition application 820, 1010, 1100 can be respectively adapted to detect these correlations to indicate a skill set of the gamer that may be consistent between different games. For example, a sniper and bowman have a similar trait that requires marksmanship, calm nerves, and knowing when to strike. This trait can be identified, e.g., by the AMS application and can be used to identify other games in which the gamer may perform well. This trait can also be advertised to other gamers to promote teams.

The processes depicted in FIGS. 5-7 and 12 can be adapted to operate in whole or in part in a gaming accessory, in an operating system of a computer, in a gaming console, in a gaming application that generates the video game, in a dongle, or any other suitable software application and/or device.

The processes of FIGS. 7 and 12 can be adapted to ignore or filter game action results, which may not be relevant to the gamer or analysts. For instance, the either or both of the AMS application 808 and the competition application 820, 1010, 1100 can be adapted to ignore (or filter) game action results relating to navigation of the avatar (e.g., turn around, jump, etc.). Either or both of the AMS application 808 and the competition application 820, 1010, 1100 can also be adapted to ignore (or filter) game action results relating to preparatory actions such as reloading a gun, switching between weapons, and so on. In other embodiments, either or both of the AMS application 808 and the competition application 820, 1010, 1100 can be adapted to selectively monitor only particular stimulus signals and/or game result actions such as misses, non-kill hits, kills, and life of the avatar. Either or both of the AMS application 808 and the competition application 820, 1010, 1100 can also be adapted to monitor gaming action results with or without temporal data associated with the stimuli and game action results.

In some embodiments, either or both of the AMS application 808 and the competition application 820, 1010, 1100 can be respectively adapted to track stimuli (or substitutions thereof) by submission order, and order of gaming action results supplied by the gaming application, and perform cataloguing thereof by the respective order of stimuli and gaming action results. The items can be respectively catalogued by each of the AMS application 808 and the competition application 820, 1010, 1100 with or without temporal data.

In at least some embodiments, either or both of the AMS application 808 and the competition application 820, 1010, 1100 can be adapted to collect gaming action results for "all" or a substantial portion of stimuli (or substitutions thereof) transmitted to the gaming application. In this embodiment, either or both of the AMS application 808 and the competition application 820, 1010, 1100 can be adapted to enable a gamer to replay portions of the game to allow the gamer to visualize (in slow motion, still shots, or regular play speed) the actions taken by the gamer (i.e., accessory stimuli and/or substitute stimuli) to help the gamer identify areas of the game where his/her performance can be improved.

In at least some embodiments, either or both of the AMS application 808 and the competition application 820, 1010, 1100 can be implemented as a distributed system (e.g., one or more servers executing one or more virtual machines) enabling multiples users to control aspects of either or both of the AMS application 808 and the competition application 820, 1010, 1100. For example, in a tournament setting, gaming analysts having access to the AMS application can request a replay of portions of the game to demonstrate exceptional plays versus missed plays at a JumboTron™ display. The gamers can access either or both of the AMS application 808 and the competition application 820, 1010, 1100 to establish new substitute stimuli, perform calibrations on macros, or invoke or create additional gaming profiles. Portions of either or both of the AMS application 808 and the competition application 820, 1010, 1100 can also be implemented by equipment of unaffiliated parties or service providers of gaming services.

In some embodiments, either or both of the AMS application 808 and the competition application 820, 1010, 1100 can be respectively adapted to substitute an accessory stimulus (or stimuli) for a macro comprising a combination of substitute stimuli, and track the macro when gaming action results are received from the gaming application rather than track each individual substitute stimulus of the macro. Either or both of the AMS application 808 and the competition application 820, 1010, 1100 can be adapted to monitor macros by tracking an order of stimuli (or substitutes) associated with the macro that are transmitted to the gaming application and by tracking an order of gaming action results received from the gaming application, which are associated with the macro. Alternatively, or in combination, either or both of the AMS application 808 and the competition application 820, 1010, 1100 can add a unique identifier to the substitute stimuli to identify the stimuli as being associated with the macro.

Either or both of the AMS application 808 and the competition application 820, 1010, 1100 can be adapted to catalogue the gaming action results associated with the macro in a manner that allows the gamer to identify a group of gaming action results as being associated with the macro. Either or both of the AMS application 808 and the competition application 820, 1010, 1100 can also be adapted to collect sufficient data to assess each individual gaming action result of the macro (e.g., temporal data, hits, misses, etc.). The presentation of catalogued macro data can be hierarchical. For example, the AMS application can present a particular macro by way of a high level GUI that indicates the macro caused a kill. Either or both of the AMS application 808 and the competition application 820, 1010, 1100 can be adapted to enable the gamer to select a different GUI that enables the user to visualize a gaming action result for each stimulus of the macro to determine how effective the macro was in performing the kill, and whether further adjustments of the macro might improve the gamer's performance.

In some embodiments, either or both of the AMS application 808 and the competition application 820, 1010, 1100 can be respectively adapted to present more or less competitive information. In some embodiments, for example, either or both of the AMS application 808 and the competition application 820, 1010, 1100 can be adapted to present competitive information without the virtual peripherals. In one example, the AMS application can be adapted to present scrollable pages of competitive information with or without the virtual peripherals. In other illustrations, either or both of the AMS application 808 and the competition application 820, 1010, 1100 can be adapted to present competitive information without a viewing of the game or the gamer. Other variants of presenting competitive information or other data are contemplated by the present disclosure.

The foregoing embodiments are a subset of possible embodiments contemplated by the present disclosure. Other suitable modifications can be applied to the present disclosure.

Figure 14:
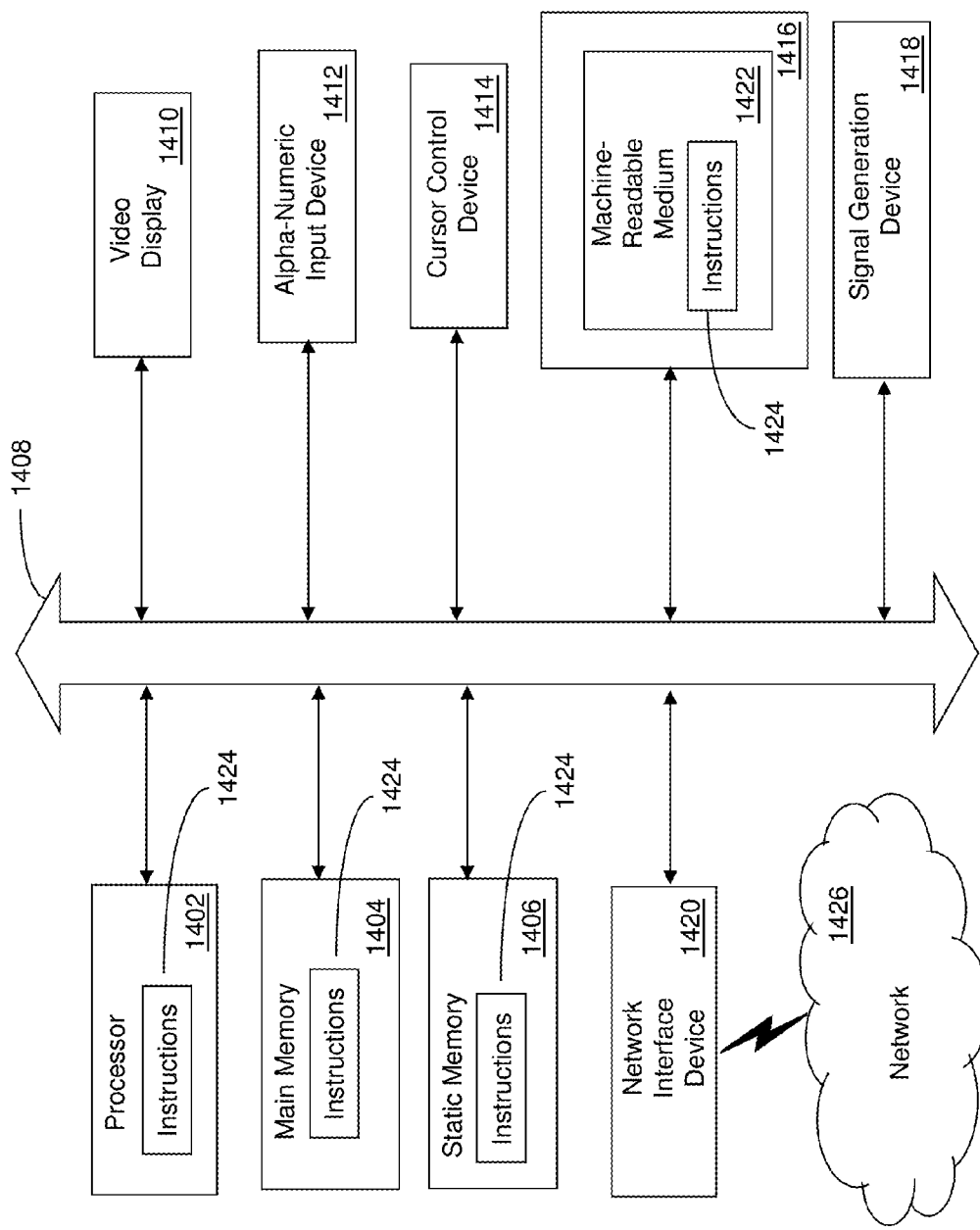
FIG. 14 depicts an illustrative diagrammatic representation of a machine in the form of a computer system within which a set of instructions, when executed, may cause the machine to perform any one or more of the methodologies disclosed herein.

FIG. 14 depicts an exemplary diagrammatic representation of a machine in the form of a computer system 1400 within which a set of instructions, when executed, may cause the machine to perform any one or more of the processes and techniques discussed above. One or more instances of the machine can operate as any of devices depicted in FIGS. 1-3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the processes and techniques discussed herein.

The computer system 1400 may include a processor 1402 (e.g., a central processing unit (CPU), a graphics processing unit (GPU, or both), a main memory 1404 and a static memory 1406, which communicate with each other via a bus 1408. The computer system 1400 may further include a video display unit 1410 (e.g., a liquid crystal display (LCD), a flat panel, or a solid state display. The computer system 1400 may include an input device 1412 (e.g., a keyboard), a cursor control device 1414 (e.g., a mouse), a disk drive unit 1416, a signal generation device 1418 (e.g., a speaker or remote control) and a network interface device 1420.

The disk drive unit 1416 may include a tangible computer-readable storage medium 1422 on which is stored one or more sets of instructions (e.g., software 1424) embodying any one or more of the processes, techniques or functions described herein, including those processes illustrated above. The instructions 1424 may also reside, completely or at least partially, within the main memory 1404, the static memory 1406, and/or within the processor 1402 during execution thereof by the computer system 1400. The main memory 1404 and the processor 1402 also may constitute tangible computer-readable storage media.

Dedicated hardware implementations including, but not limited to, application specific integrated circuits, programmable logic arrays and other hardware devices can likewise be constructed to implement the processes and techniques described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the processes and techniques described herein are intended for operation as software programs running on a computer processor. Furthermore, software implementations can include, but not limited to, distributed processing or component/object distributed processing, parallel processing, or virtual machine processing can also be constructed to implement the processes and techniques described herein.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the processes and techniques of the present disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1400.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the present disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
modifying, by a competition system comprising a processor, a first stimulus signal from a first gaming accessory device in a gaming session of a game application used by a first contestant of a plurality of contestants according to a first gaming action result, resulting in a modified first stimulus signal;
modifying, by the competition system, a second stimulus signal from the first gaming accessory device used by the first contestant according to a second gaming action result in the gaming session of the game application resulting in a modified second stimulus signal;
determining, by the competition system, a quantitative performance measure based on the modified first stimulus signal and the modified second stimulus signal based on proficiencies of the first contestant in performing a first gaming action and a second gaming action with the first gaming accessory device, respectively; and
providing, by the competition system, feedback that includes the quantitative performance measure via a graphical user interface coupled to the competition system.

2. The method of claim 1, further comprising:
associating, by the competition system, the first stimulus signal with the first gaming action; and
associating, by the competition system, the second stimulus signal with the second gaming action.

3. The method of claim 1, further comprising:
filtering, by the competition system, the first stimulus signal into a third modified stimulus signal; and
measuring, by the competition system, the third modified stimulus signal based on the first gaming action and the first gaming action result.

4. The method of claim 1, wherein the quantitative performance measure comprises one of a magnitude of the first stimulus signal, a rate of change of the first stimulus signal, an accuracy of a gaming action result generated by the gaming application in response to the first stimulus signal, a summation of the first stimulus signal with another stimulus signal, an average of the first stimulus signal with the another stimulus signal, or a combination thereof.

5. The method of claim 4, wherein the quantitative performance measure further comprises one of a magnitude of the second stimulus signal, a rate of change of the second stimulus signal, an accuracy of a gaming action result generated by the gaming application in response to the second stimulus signal, a summation of the second stimulus signal with another stimulus signal, an average of the second stimulus signal with the another stimulus signal, or a combination thereof.

6. The method of claim 1, wherein the modifying of the first stimulus signal according to the first gaming action result further comprises filtering, by the competition system, the first stimulus signal, resulting in a filtered first stimulus signal, and wherein the modifying of the second stimulus signal according to the second gaming action result further comprises filtering, by the competition system, the second stimulus signal, resulting in a filtered second stimulus signal.

7. The method of claim 6, wherein the feedback is based on the first filtered stimulus signal and the second filtered stimulus signal.

8. A device, comprising:
a processing system including a processor; and
a memory that stores executable instructions that, when executed by the processing system, facilitate performance of operations, the operations comprising:
modifying a first stimulus signal from a first accessory device in a session of an application used by a first contestant of a plurality of contestants according to a first result from the application responsive to the first stimulus signal to generate a first modified signal;
modifying a second stimulus signal from the first accessory device used by the first contestant according to a second result from the application responsive to the second stimulus signal to generate a second modified signal;
determining a performance measure based on the first modified signal and the second modified signal based on proficiencies of the first contestant in performing a first action and a second action with the first accessory device in the application, respectively; and
providing feedback that includes the performance measure via a graphical user interface coupled to the device.

9. The device of claim 8, wherein the operations further comprise:
associating the first stimulus signal with the first action; and
associating the second stimulus signal with the second action.

10. The device of claim 8, wherein the operations further comprise:
generating a graph including a metric based on the performance measure, wherein the graph provides an indication of relative performance between the plurality of contestants; and
providing the graph to the graphical user interface.

11. The device of claim 8, wherein the performance measure comprises one of a magnitude of the first stimulus signal, a rate of change of the first stimulus signal, an accuracy of an action result generated by the application in response to the first stimulus signal, a summation of the first stimulus signal with another stimulus signal, an average of the first stimulus signal with the another stimulus signal, or a combination thereof.

12. The device of claim 8, wherein the performance measure comprises one of a magnitude of the second stimulus signal, a rate of change of the second stimulus signal, an accuracy of an action result generated by the application in response to the second stimulus signal, a summation of the second stimulus signal with another stimulus signal, an average of the second stimulus signal with the another stimulus signal, or a combination thereof.

13. The device of claim 8, wherein the modifying of the first stimulus signal according to a first action result from the first stimulus signal further comprises filtering the first stimulus signal, resulting in a filtered first stimulus signal, and wherein the modifying of the second stimulus signal according to a second action result from the second stimulus signal further comprises filtering the second stimulus signal, resulting in a filtered second stimulus signal, and wherein the feedback is based on the first filtered stimulus signal and the second filtered stimulus signal.

14. A machine-readable storage medium, comprising executable instructions that, when executed by a processing system including a processor, facilitate performance of operations, the operations comprising:

providing a first stimulus signal to a computing device performing a gaming session of a game application used by a first contestant of a plurality of contestants, wherein the first stimulus signal is modified according to a first gaming result based on a first reaction of the game application to the first stimulus signal, resulting in a first modified stimulus signal;

providing a second stimulus signal to the computing device, wherein the second stimulus signal is modified according to a second gaming result based on a second reaction of the game application to the second stimulus signal, resulting in a second modified stimulus signal;

receiving the first modified stimulus signal and the second modified stimulus signal;

determining a quantitative performance measure based on the first modified stimulus signal and the second modified stimulus signal based on proficiencies of the first contestant in performing a first gaming action and a second gaming action in the game application, respectively; and providing feedback to the computing device that includes the quantitative performance measure to be displayed via a graphical user interface coupled to the computing device.

15. The machine-readable storage medium of claim 14, wherein the computing device associates the first stimulus signal with the first gaming action and associates the second stimulus signal with the second gaming action.

16. The machine-readable storage medium of claim 14, wherein the quantitative performance measure comprises one of a magnitude of the first stimulus signal, a rate of change of the first stimulus signal, an accuracy of a gaming result generated by the gaming application in response to the first stimulus signal, a summation of the first stimulus signal with another stimulus signal, an average of the first stimulus signal with the another stimulus signal, a magnitude of the second stimulus signal, a rate of change of the second stimulus signal, an accuracy of a gaming result generated by the gaming application in response to the second stimulus signal, a summation of the second stimulus signal with another stimulus signal, an average of the second stimulus signal with the another stimulus signal, or a combination thereof.

17. The machine-readable storage medium of claim 14, wherein the operations further comprise receiving an identification of the game application, wherein the determining the quantitative performance measure is performed according to the identification of the game application.

18. The machine-readable storage medium of claim 17, wherein the operations further comprise generating a contest based on the quantitative performance measure for the first contestant against the plurality of contestants.

19. The machine-readable storage medium of claim 18, wherein the contest comprises one of a first contest based on a rate of receiving the first stimulus signal and the second stimulus signal, a second contest based on a number of occurrences of the first stimulus signal and the second stimulus signal, a third contest based on an accuracy of gaming results produced by the game application according to the first stimulus signal and the second stimulus signal produced by the game application, or a combination thereof.

20. The machine-readable storage medium of claim 14, wherein the operations further comprise:

generating a graph including a metric based on the quantitative performance measure, wherein the graph provides an indication of relative performance between members of a social network; and providing the graph to the graphic user interface.

* * * * *